United States Patent
Watanabe

(10) Patent No.: US 12,235,771 B2
(45) Date of Patent: Feb. 25, 2025

(54) MEMORY SYSTEM INCLUDING NONVOLATILE MEMORY

(71) Applicant: Kioxia Corporation, Tokyo (JP)

(72) Inventor: Shuichi Watanabe, Fujisawa (JP)

(73) Assignee: Kioxia Corporation, Tokyo (JP)

( * ) Notice: Subject to any disclaimer, the term of this patent is extended or adjusted under 35 U.S.C. 154(b) by 55 days.

(21) Appl. No.: 18/174,745

(22) Filed: Feb. 27, 2023

(65) Prior Publication Data

US 2023/0376422 A1 Nov. 23, 2023

(30) Foreign Application Priority Data

May 17, 2022 (JP) .................. 2022-080917

(51) Int. Cl.
 *G06F 12/10* (2016.01)

(52) U.S. Cl.
 CPC ...... *G06F 12/10* (2013.01); *G06F 2212/1016* (2013.01); *G06F 2212/7201* (2013.01)

(58) Field of Classification Search
 CPC ............. G06F 12/10; G06F 2212/1016; G06F 2212/7201
 See application file for complete search history.

(56) References Cited

U.S. PATENT DOCUMENTS

| | | | | |
|---|---|---|---|---|
| 6,708,330 | B1* | 3/2004 | Moberg | G06F 9/44521 719/331 |
| 10,048,881 | B2 | 8/2018 | Sankaran et al. | |
| 11,182,092 | B1 | 11/2021 | Tsirkin et al. | |
| 2007/0214339 | A1* | 9/2007 | Wooten | G06F 12/1027 711/E12.067 |
| 2010/0325522 | A1 | 12/2010 | Tsukamoto et al. | |
| 2015/0046634 | A1 | 2/2015 | Maeda et al. | |
| 2020/0174819 | A1 | 6/2020 | Dong et al. | |
| 2021/0182212 | A1 | 6/2021 | Borikar et al. | |
| 2023/0205449 | A1* | 6/2023 | Jeong | G06F 3/0655 711/118 |
| 2023/0325321 | A1* | 10/2023 | Helmick | G06F 3/064 |

* cited by examiner

*Primary Examiner* — Kalpit Parikh
(74) *Attorney, Agent, or Firm* — Oblon, McClelland, Maier & Neustadt, L.L.P.

(57) ABSTRACT

According to one embodiment, in response to receiving a read command from a host, a controller executes a command process of reading data from a nonvolatile memory. The controller executes an address translation process of translating a virtual address specified in the read command to a physical address for accessing a memory of the host. In the address translation process, the controller transmits an address translation request to the host. In response to receiving from the host a response indicating that obtainment of address translation information fails, the controller suspends the command process until the address translation information is obtained, and after the address translation information is obtained, resumes the command process.

7 Claims, 15 Drawing Sheets

F.I.G. 1

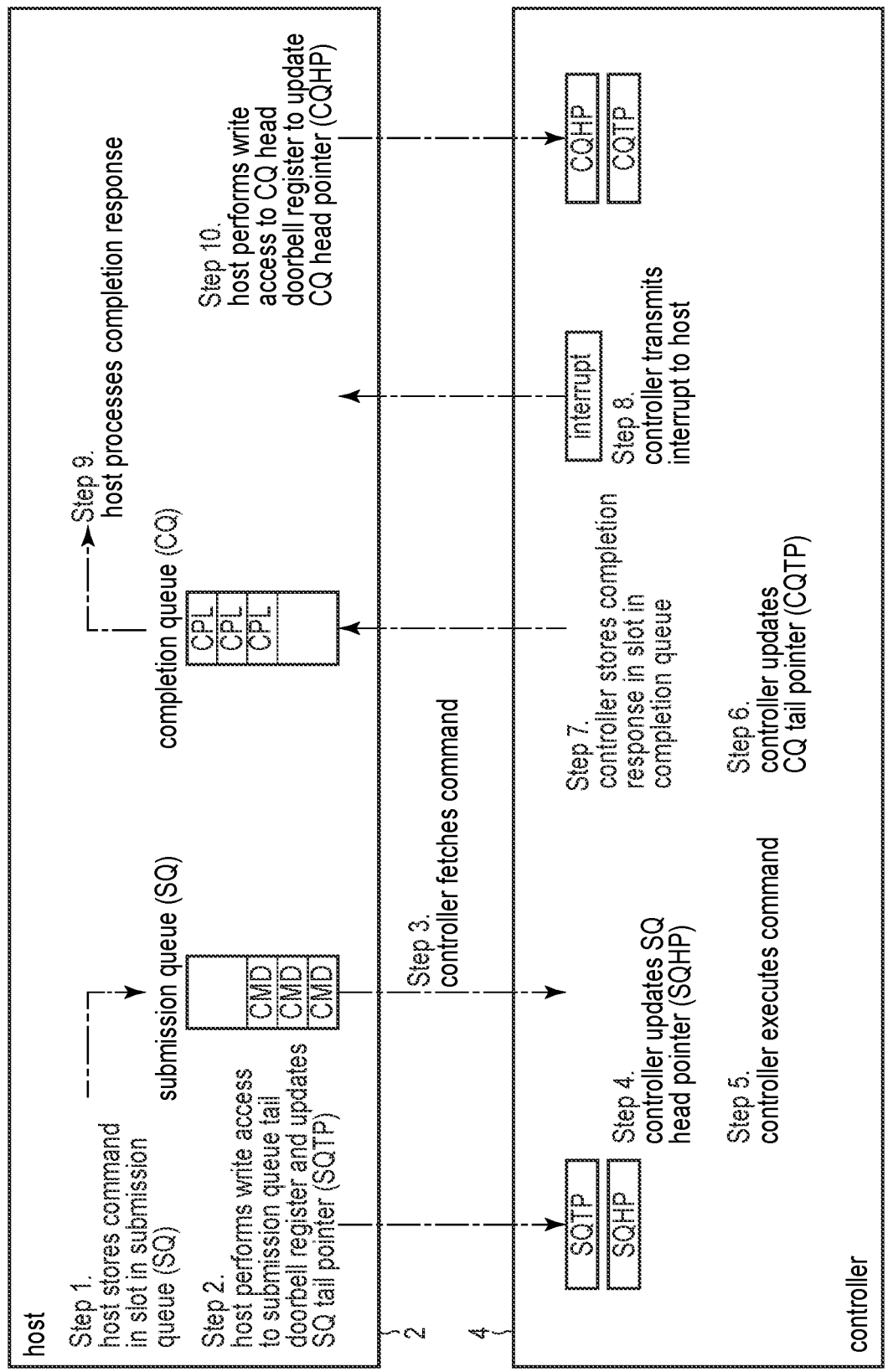
F I G. 2

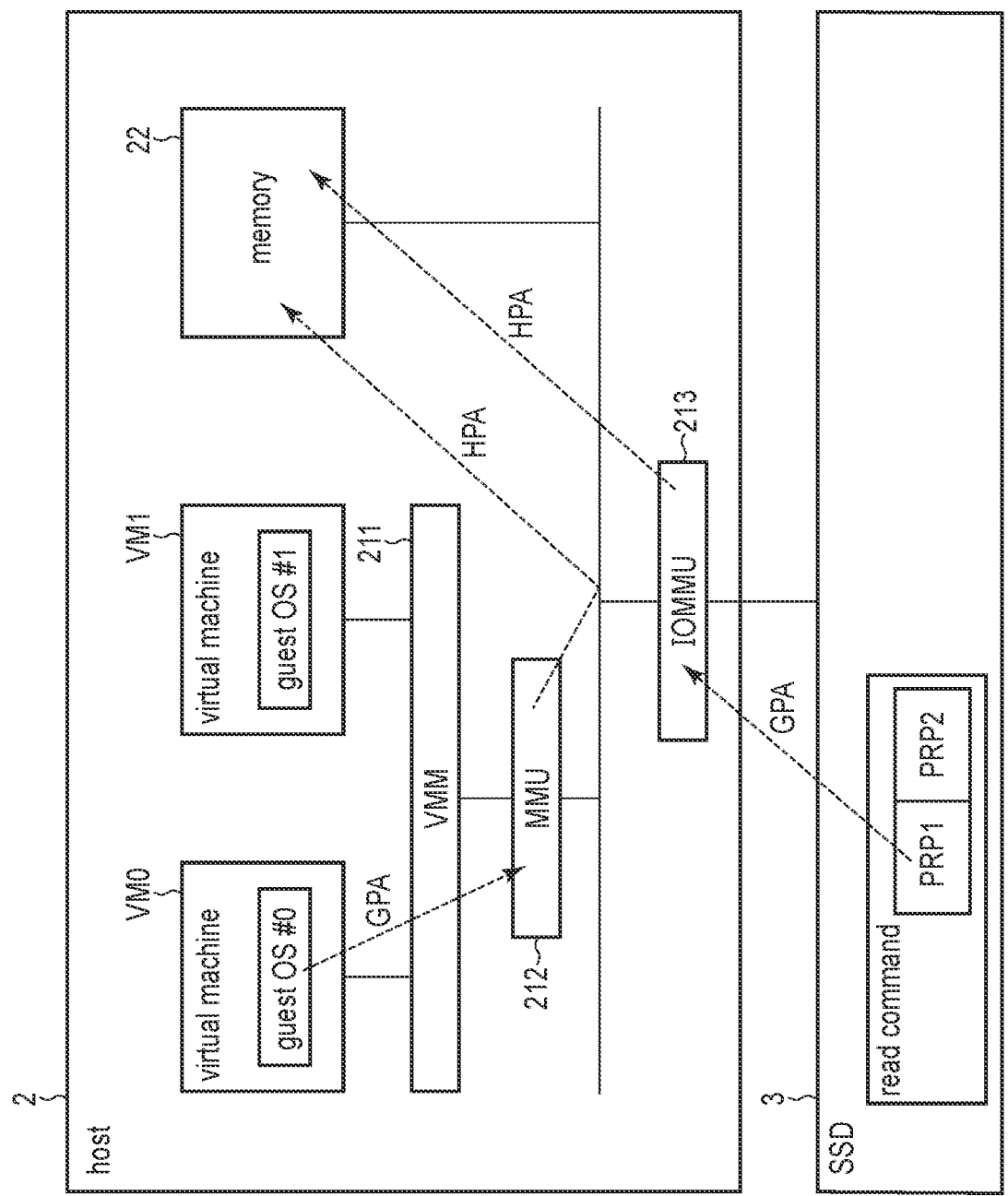
F I G. 3

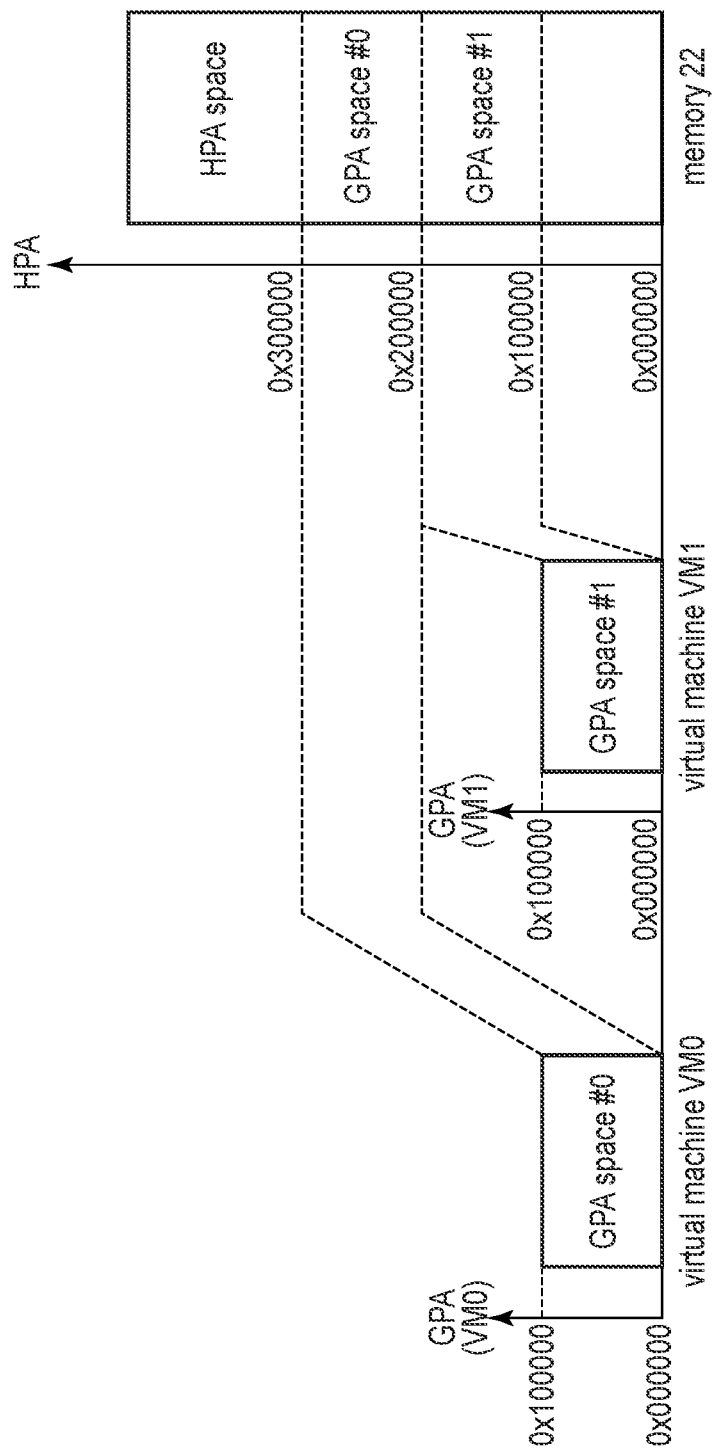
F I G. 4

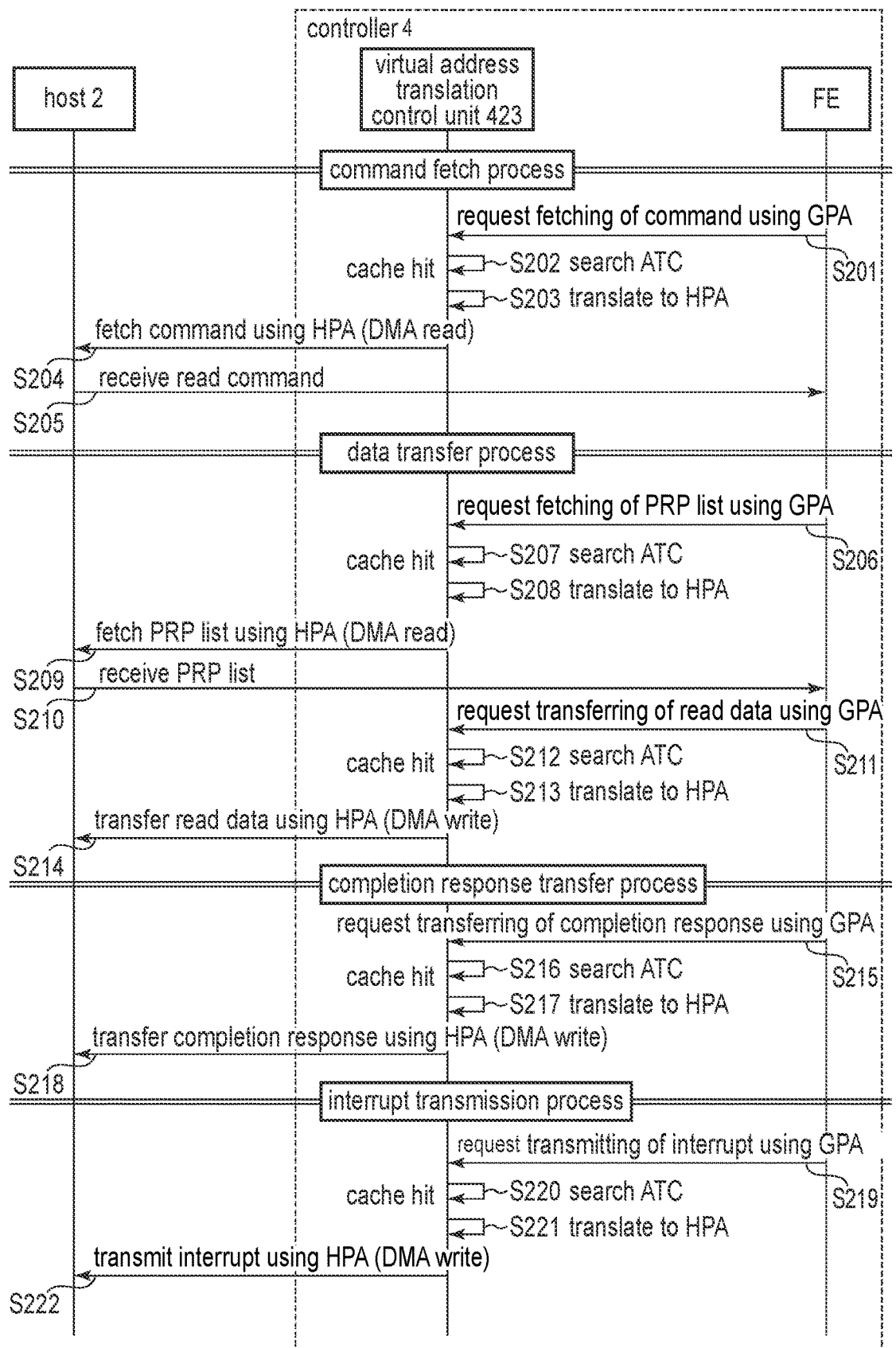
F I G. 8

MEMORY SYSTEM INCLUDING NONVOLATILE MEMORY

CROSS-REFERENCE TO RELATED APPLICATIONS

This application is based upon and claims the benefit of priority from Japanese Patent Application No. 2022-080917, filed May 17, 2022, the entire contents of which are incorporated herein by reference.

FIELD

Embodiments described herein relate generally to technology for controlling a nonvolatile memory.

BACKGROUND

Memory systems implemented with a nonvolatile memory have recently become widespread. As such memory systems, a solid state drive (SSD) implemented with a NAND flash memory has been known.

A controller of the memory system processes an input/output (I/O) command received from a host. The controller then transmits various information such as data, a response, an interrupt, and so on, to the host.

If the transmission of the information from the controller to the host is delayed, the information to be transmitted to the host may stay in the controller. Such stay of the information may be a factor that degrades an I/O performance of the memory system.

Therefore, in the memory system, it is required to implement a technology capable of mitigating a degradation in the I/O performance caused by the information to be sent to the host staying in the controller.

BRIEF DESCRIPTION OF THE DRAWINGS

FIG. 2 is a diagram illustrating a procedure of a series of processes for processing an I/O command, which is executed in the memory system according to the embodiment.

FIG. 3 is a diagram illustrating an operation of accessing a memory of a host which is executed in the memory system according to the embodiment, and an operation of accessing the memory of the host which is executed in a virtual machine of the host.

FIG. 4 is a diagram illustrating a relationship between a guest physical address space and a host physical address space, which are used by the host.

FIG. 8 is a sequence diagram illustrating a first example of a procedure of a command process for a read command, which is executed in the memory system according to the embodiment.

DETAILED DESCRIPTION

Various embodiments will be described hereinafter with reference to the accompanying drawings.

In general, according to one embodiment, a memory system is connectable to a host. The memory system comprises a nonvolatile memory, and a controller electrically connected to the nonvolatile memory and configured to control the nonvolatile memory. In response to receiving, from the host, a first read command that requests reading first data and specifies a first virtual address in a virtual address space of the host, the controller executes a command process of reading the first data from the nonvolatile memory. The controller executes an address translation process of translating the first virtual address to a first physical address for accessing a memory of the host. In the address translation process, the controller transmits an address translation request to the host, the address translation request being a request for obtaining first address translation information for translating the first virtual address to the first physical address. In response to receiving, from the host, a response indicating that obtainment of the first address translation information fails, the controller suspends the command process until the first address translation information is obtained, and, after the first address translation information is obtained, resumes the command process.

Figure 1:
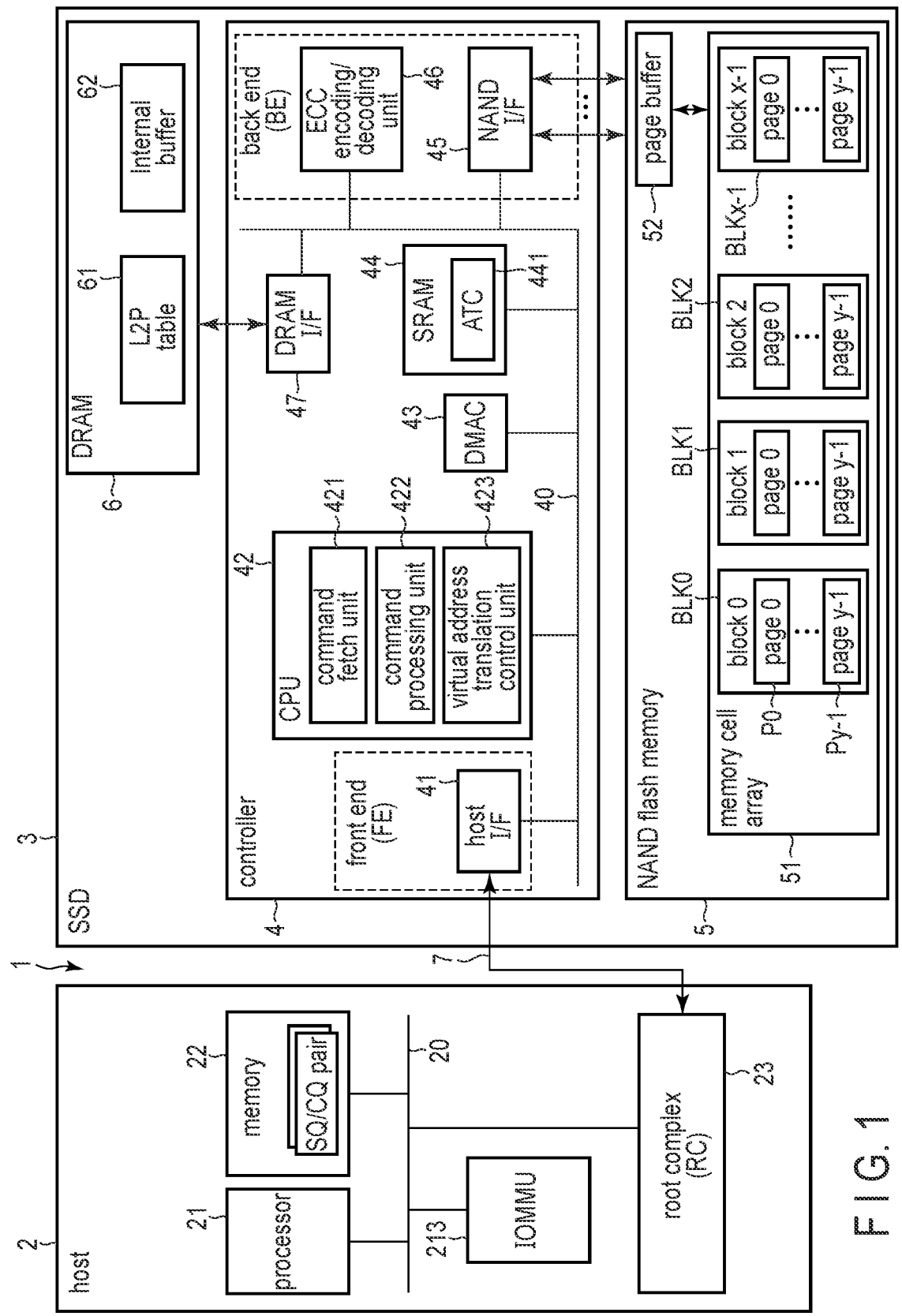
FIG. 1 is a block diagram illustrating an example of a configuration of an information processing system that includes a memory system according to an embodiment.

It is assumed that a memory system according to an embodiment is implemented as an SSD. FIG. 1 is a block diagram illustrating an example of a configuration of an information processing system 1 that includes the memory system according to the embodiment. The information processing system 1 includes a host (host device) 2 and an SSD 3. The host 2 and the SSD 3 can be connected via a bus 7.

The host 2 is an information processing apparatus. The host 2 is, for example, a personal computer, a server computer, or a mobile device. The host 2 accesses the SSD 3. Specifically, the host 2 transmits, to the SSD 3, a write command that is a command to write data. The host 2 also transmits, to the SSD 3, a read command that is a command to read data.

The host 2 includes a processor 21, a memory 22, a root complex (RC) 23, and an input/output memory management unit (IOMMU) 213. The processor 21, the memory 22, the root complex 23, and the IOMMU 213 are interconnected via an internal bus 20.

The SSD 3 is a storage device that is connectable to the host 2. The SSD 3 includes a nonvolatile memory. The SSD 3 writes data to the nonvolatile memory. The SSD 3 also reads data from the nonvolatile memory.

Communication between the SSD 3 and the host 2 is executed via the bus 7. The bus 7 is a communication path that connects the host 2 and the SSD 3. The bus 7 is, for example, a PCI Express™ (PCIe™) bus. The PCIe bus is a full-duplex communication path. The full-duplex communication path includes both a transmission path that transmits data and an input/output (I/O) command from the host 2 to the SSD 3, and a transmission path that transmits data and a response from the SSD 3 to the host 2. The I/O command is a command for writing or reading data to or from the nonvolatile memory. The I/O command is, for example, a write command or a read command.

As a standard of a logical interface for connecting the host 2 and the SSD 3, a standard of NVM Express™ (NVMe™) may be used. In the interface of the NVMe standard, communication between the host 2 and the SSD 3 is performed using a pair of queues that include at least one submission queue (SQ) and a completion queue (CQ) associated with the at least one submission queue (SQ). The pair of queues is referred to as a submission queue/completion queue pair (SQ/CQ pair).

The submission queue (SQ) is a queue used to issue a command to the SSD 3. The submission queue (SQ) contains a plurality slots. Each of the plurality slots is capable of storing a command. The host 2 creates the submission queue (SQ) in the memory 22 of the host 2. The host 2 also issues a submission queue (SQ) create command to the SSD 3. The submission queue (SQ) create command notifies the SSD 3 of an address indicating a memory location in the memory 22 where the submission queue (SQ) has been created, the size of the submission queue (SQ), a completion queue (CQ) identifier associated with the submission queue (SQ), and so on.

The completion queue (CQ) is a queue used to receive, from the SSD 3, a completion response indicating completion of a command. The completion response contains information indicating a status of the completed command. The completion response is also referred to as a command completion or a command completion notification. The completion queue (CQ) contains a plurality of slots. Each of the plurality of slots is capable of storing a completion response. The host 2 creates the completion queue (CQ) in the memory 22 of the host 2. The host 2 also issues a completion queue (CQ) create command to the SSD 3. The completion queue (CQ) create command notifies the SSD 3 of an address indicating a memory location in the memory 22 where the completion queue (CQ) has been created, the size of the completion queue (CQ), and so on.

Next, a configuration of the host 2 will be described.

The processor 21 is, for example, a central processing unit (CPU). The processor 21 executes software (host software) loaded into the memory 22 from the SSD 3 or another storage device connected to the host 2. The host software includes, for example, a virtual machine monitor, a guest operating system (guest OS) that is an operating system executed on the virtual machine monitor, and application programs.

The memory 22 is, for example, a volatile memory. The memory 22 is also referred to as a main memory, a system memory, or a host memory. The memory 22 is, for example, a dynamic random access memory (DRAM). A part of a memory region of the memory 22 is used to store the SQ/CQ pair.

In the communication between the host 2 and the SSD 3, a command is issued from the host 2 to the SSD 3 and a completion response is transmitted from the SSD 3 to the host 2, using the SQ/CQ pair. The transfer of command, data, and completion response between the host 2 and the SSD 3 is executed via the bus 7.

The root complex 23 is a circuit that connects I/O devices (here, the SSD 3) connected to the bus 7, to each of the processor 21 and the memory 22. The root complex 23 is connected to each of the processor 21 and the memory 22. The root complex 23 may be connected to each of the processor 21 and the memory 22 via, for example, the internal bus 20. The root complex 23 also executes communications with the SSD 3 via the bus 7.

The IOMMU 213 is a circuit that translates addresses included in various requests received from the SSD 3. The IOMMU 213 translates an address used by the SSD 3 into an address used internally by the host 2.

Next, an internal configuration of the SSD 3 will be described. The SSD 3 includes a controller 4 and a nonvolatile memory 5. The nonvolatile memory 5 is, for example, a NAND flash memory. The NAND flash memory is also referred to as a NAND memory. In the following, the nonvolatile memory 5 is referred to as a NAND memory 5. The SSD 3 may also include a random access memory, for example, a dynamic random access memory (DRAM) 6.

The controller 4 is a memory controller. The controller 4 is, for example, a circuit such as a system-on-a-chip (SoC). The controller 4 is electrically connected to the NAND memory 5. The controller 4 executes a data write operation of writing data to the NAND memory 5 and a data read operation of reading data from the NAND memory 5. The controller 4 also executes communication with the host 2 via the bus 7. As a physical interface connecting the controller 4 and the NAND memory 5, for example, a Toggle NAND flash interface, or an open NAND flash interface (ONFI) is used. The functions of each part of the controller 4 may be implemented by dedicated hardware, a processor that executes a program, or a combination of the dedicated hardware and the processor.

The NAND memory 5 is a nonvolatile memory. The NAND memory 5 includes a memory cell array 51 and a page buffer 52. The memory cell array 51 includes a plurality of memory cells arranged in a matrix. The NAND memory 5 may be a flash memory of a two-dimensional structure or a flash memory of a three-dimensional structure.

The memory cell array 51 of the NAND memory 5 includes a plurality of blocks BLK0 to BLKx−1. Each of the blocks BLK0 to BLKx−1 includes a plurality of pages (here, pages P0 to Py−1). Each page includes, for example, a plurality of memory cells connected to the same word line. Each of the blocks BLK0 to BLKx−1 is a unit for a data erase operation for erasing data. Each of the pages P0 to Py−1 is a unit for a program operation and a sense operation, each of the program operation and the sense operation being described later.

The page buffer 52 is configured with, for example, a static RAM (SRAM). The page buffer 52 temporarily stores data to be transferred between the controller 4 and the NAND memory 5.

In performing a data write operation, data received from the controller 4 is temporarily stored in the page buffer 52, and then the data temporarily stored in the page buffer 52 is programmed into the memory cell array 51. The operation of temporarily storing the data received from the controller 4 in the page buffer 52 is referred to as a data-in operation. The operation of programming (writing) the data temporarily stored in the page buffer 52 into the memory cell array 51 is referred to as a program operation.

In performing a data read operation, data read from the memory cell array 51 is temporarily stored in the page buffer 52, and then the data temporarily stored in the page buffer 52 is output to the controller 4. The operation of temporarily storing the data read from the memory cell array 51 in the page buffer 52 is referred to as a sense operation. The operation of outputting the data temporarily stored in the page buffer 52 to the controller 4 is referred to as a data-out operation.

Each of the data-in operation and the data-out operation is an operation of transferring data between the controller 4 and the NAND memory 5. Each of the program operation and the sense operation is an operation with data transfer within the NAND memory 5 without data transfer between the controller 4 and the NAND memory 5. Therefore, each I/O operation executed on the NAND memory 5 (i.e., a data write operation or a data read operation) includes at least (i) an operation of transferring data between the controller 4 and the NAND memory 5, and (ii) an operation with data transfer within the NAND memory 5 without data transfer between the controller 4 and the NAND memory 5.

A DRAM 6 is a volatile memory. A part of the memory region of the DRAM 6 is used, for example, for storing a logical-to-physical translation table (L2P table) 61. The L2P table 61 stores mapping information. The mapping information is information that indicates mapping between each of logical addresses and each of physical addresses of the NAND memory 5. In addition, a part of the memory region of the DRAM 6 is also used as an internal buffer 62. The internal buffer 62 temporarily stores, for example, write data received from the host 2 or read data read from the NAND memory 5.

Next, an internal configuration of the controller 4 will be described. The controller 4 includes a host interface (host I/F) 41, a central processing unit (CPU) 42, a direct memory access controller (DMAC) 43, a static RAM (SRAM) 44, a NAND interface (NAND I/F) 45, an error correction code (ECC) encoding/decoding unit 46, and a DRAM interface (DRAM I/F) 47. The host interface 41, the CPU 42, the DMAC 43, the SRAM 44, the NAND interface 45, the ECC encoding/decoding unit 46, and the DRAM interface 47 are interconnected via a bus 40.

Among the components of the controller 4, one or more components that control communication with the host 2 is referred to as a front end (FE). The front end (FE) includes the host interface 41.

Among the components of the controller 4, one or more components that control communication with the NAND memory 5 is referred to as a back end (BE). The back end (BE) includes the NAND interface 45 and the ECC encoding/decoding unit 46.

The host interface 41 is a communication interface circuit. The host interface 41 executes communication with the host 2. The host interface 41 is, for example, a PCIe controller.

The host interface 41 includes an arbitration mechanism. This arbitration mechanism is a mechanism of selecting, from a plurality of submission queues of the host 2, a submission queue from which a command is to be fetched. The arbitration mechanism is, for example, a round robin arbitration mechanism or a weighted round robin arbitration mechanism.

The host interface 41 manages, for each of submission queues (SQs), a submission queue tail pointer (SQTP) and a submission queue head pointer (SQHP). In addition, the host interface 41 manages, for each of completion queues (CQs), a completion queue tail pointer (CQTP) and a completion queue head pointer (CQHP).

The CPU 42 is a processor. The CPU 42 controls the host interface 41, the DMAC 43, the SRAM 44, the NAND interface 45, the ECC encoding/decoding unit 46, and the DRAM interface 47. The CPU 42 loads a control program (firmware) stored in the NAND memory 5 or a ROM (not shown) into the SRAM 44 and performs various processes by executing the firmware. The firmware may be loaded into the DRAM 6.

The CPU 42 performs management of data stored in the NAND memory 5 and management of blocks included in the NAND memory 5, as a flash translation layer (FTL). The management of the data stored in the NAND memory 5 includes, for example, management of mapping information which is information indicating the correspondence between each of logical addresses and each of physical addresses of the NAND memory 5. A logical address is an address used by the host 2 to access the NAND memory 5. The logical address is, for example, a logical block address (LBA). The physical address of the NAND memory 5 is an address indicating a physical storage location among a plurality of physical storage locations included in the NAND memory 5. The CPU 42 manages the mapping between each of the logical addresses and each of the physical addresses using the L2P table 61. In addition, the management of blocks included in the NAND memory 5 includes management of defective blocks (bad blocks) included in the NAND memory 5, wear leveling, and garbage collection.

The DMAC 43 is a circuit that executes direct memory access (DMA). The DMAC 43 executes data transfer between the memory 22 of the host 2 and the SRAM 44 or the DRAM 6. When data is to be transferred from the controller 4 to the memory 22 of the host 2, the DMAC 43 transmits a memory write request to the root complex 23 of the host 2 and thereby writing the data to the memory 22. The memory write request includes information specifying a memory address that indicates a memory location in the memory 22 to which data is to be transferred. When data is to be transferred from the memory 22 of the host 2 to the controller 4, the DMAC 43 transmits a memory read request to the root complex 23 and thereby obtaining the data from the memory 22. The memory read request includes information specifying a memory address that indicates a memory location in the memory 22 where the data is stored.

The SRAM 44 is a volatile memory. A part of the memory region of the SRAM 44 is used by the CPU 42 as an address translation cache (ATC) 441. The ATC 441 is a cache that stores address translation information. The address translation information is information for translating a virtual address in a virtual address space of the host 2 to a physical address for accessing the memory 22 of the host 2. The virtual address space of the host 2 is an address space allocated to a virtual machine executed in the host 2. The virtual address in the virtual address space is, for example, a guest physical address (GPA). The guest physical address (GPA) is an address used by the guest OS to access the memory 22.

The NAND interface 45 is a circuit that controls the NAND memory 5. When the NAND memory 5 includes a plurality of NAND flash memory dies, the NAND interface 45 may be connected to these NAND flash memory dies via a plurality of channels.

The ECC encoding/decoding unit 46 is a circuit that executes an encoding process of encoding data and a decoding process of decoding data. When data is to be written to the NAND memory 5, the ECC encoding/decoding unit 46 executes the encoding process. In the encoding process, the ECC encoding/decoding unit 46 adds an error correction code (ECC) as a redundancy code to the data to be written to the NAND memory 5. When data is read from the NAND flash memory 5, the ECC encoding/decoding unit 46 executes the decoding process. In the decoding process, the ECC encoding/decoding unit 46 perform an error correction process for the data read from the NAND memory 5, using the ECC added to the data.

The DRAM interface 47 is a circuit that controls the DRAM 6. The DRAM interface 47 stores data in the DRAM 6 and reads data stored in the DRAM 6.

Next, a functional configuration of the CPU 42 will be described. The CPU 42 includes a command fetch unit 421, a command processing unit 422, and a virtual address translation control unit 423. A part or all of each of the command fetch unit 421, the command processing unit 422, and the virtual address translation control unit 423 may be implemented by dedicated hardware in the controller 4. For example, the command fetch unit 421 may be implemented in the host interface 41.

The command fetch unit 421 fetches I/O commands from a submission queue (SQ) of the host 2 via the host interface 41. Thus, the controller 4 is capable of receiving a plurality of I/O commands from the host 2.

The command processing unit 422 interprets an I/O command that is fetched from the submission queue (SQ) and executes a command process corresponding to the I/O command. The command process corresponding to the I/O commands is, for example, a process of writing data to the NAND memory 5 or a process of reading data from the NAND memory 5. Specifically, the command processing unit 422 instructs the NAND memory 5 to execute a data write operation or a data read operation corresponding to the I/O command. An instruction of the data write operation or the data read operation is transmitted to the NAND memory 5 via the NAND interface 45.

For example, when the I/O command received (fetched) from the host 2 is a read command, the command processing unit 422 executes a command process of reading read target data specified by the I/O command from the NAND memory 5. The read target data read from the NAND memory 5 is temporarily stored in the internal buffer 62. Then, the command processing unit 422 transfers the read target data stored in the internal buffer 62 to the memory 22 of the host 2.

The command processing unit 422 transmits a completion response indicative of completion of the I/O command, to the host 2 via the host interface 41. In this case, the command processing unit 422 stores the completion response in a completion queue (CQ) associated with the submission queue (SQ) from which this I/O command has been fetched.

Further, the command processing unit 422 transmits an interrupt message to the host 2. The interrupt message is a message for notifying the host 2 that a new completion response has been stored in the completion queue (CQ).

The virtual address translation control unit 423 executes an address translation process necessary to access the memory 22 of the host 2. The address translation process is a process that translates a virtual address notified to the controller 4 by a command received from the host 2, to a physical address for accessing the memory 22 of the host 2. The virtual address notified to the controller 4 by the command received from the host 2 is, for example, (1) a virtual address corresponding to a memory location in the memory 22 where write data to be written to the NAND memory 5 is stored, (2) a virtual address corresponding to a memory location in the memory 22 where a list including a plurality of virtual addresses is stored, the plurality of virtual addresses respectively corresponding to a plurality of memory locations in the memory 22 where write data to be written to the NAND memory 5 is stored, (3) a virtual address corresponding to a memory location in the memory 22 to which read data read from the NAND memory 5 is to be transferred, (4) a virtual address corresponding to a memory location in the memory 22 where a list including a plurality of virtual addresses is stored, the plurality of virtual addresses respectively corresponding to a plurality of memory locations in the memory 22 to which read data read from the NAND memory 5 is to be transferred, (5) a virtual address corresponding to a memory location in the memory 22 where a submission queue (SQ) exists, (6) a virtual address corresponding to a memory location in the memory 22 where a completion queue (CQ) exists, or (7) a virtual address corresponding to a memory location in the memory 22 to which an interrupt message is to be transferred. The virtual address translation control unit 423 executes, for example, an ATC search process, an address translation request issuing process, or a page request issuing process.

In the ATC search process, the virtual address translation control unit 423 determines whether or not address translation information corresponding to a target virtual address to be translated is stored in the ATC 441. When the address translation information is stored in the ATC 441, the virtual address translation control unit 423 translates the target virtual address to a physical address of the memory 22 using the address translation information stored in the ATC 441. When the address translation information is not stored in the ATC 441, the address translation process performed using the ATC 441 fails. In this case, the virtual address translation control unit 423 executes the address translation request issuing process.

In the address translation request issuing process, the virtual address translation control unit 423 transmits an address translation request to the host 2. The address translation request is a request for obtaining an address translation information for translating the target virtual address to a physical address of the memory 22. Upon receiving the address translation request, the host 2 executes a process of obtaining the address translation information corresponding to the virtual address specified by the address translation request. When the address translation information can be obtained, the host 2 transmits the address translation information to the virtual address translation control unit 423 of the SSD 3. Upon receiving the address translation information, the virtual address translation control unit 423 translates the virtual address to a physical address of the memory 22 using the received address translation information. When the address translation information cannot be obtained, the host 2 transmits a response indicating that obtainment of the address translation information fails, to the virtual address translation control unit 423 of the SSD 3. When receiving, from the host 2, the response indicating that the obtainment of the address translation information fails, the virtual address translation control unit 423 executes the page request issuing process.

In the page request issuing process, the virtual address translation control unit 423 transmits a page request to the host 2. The page request is a message for requesting preparation of address translation information necessary for the address translation process. The host 2, which has received the page request, executes a process of preparing the address translation information necessary to translate the virtual address to a physical address of the memory 22. When the preparation of the address translation information is completed, the host 2 transmits a response indicating that the preparation of the address translation information is completed, to the virtual address translation control unit 423 of the SSD 3. The virtual address translation control unit 423, which has received the response indicating that the preparation of the address translation information is completed, transmits an address translation request to the host 2 again. The host 2, which has received the address translation request, transmits a response to the address translation request, to the virtual address translation control unit 423 of the SSD 3. The response to the address translation request includes the prepared address translation information. Upon receiving the response, the virtual address translation control unit 423 translates the virtual address to a physical address of the memory 22 using the address translation information included in the received response.

The virtual address translation control unit 423 also notifies the command processing unit 422 or the command fetch unit 421 of information about a status of the address translation process, such as (1) information indicating success (cache hit) or failure (cache miss) of the ATC search process, (2) information indicating success or failure of obtainment of the address translation information executed in the host 2 in response to the address translation request, or (3) information indicating the completion of the process of preparing the address translation information executed in the host 2 in response to the page request.

Time required to obtain a physical address of the memory 22 depends on the status of the address translation process. For example, in a case where a cache miss occurs in the ATC 441, the time required to obtain a physical address of the memory 22 becomes longer than in a case where a cache hit occurs in the ATC 441. In a case where a response indicating that the obtainment of the address translation information is failed is received from the host 2, the time required to obtain a physical address of the memory 2 will become much longer. Until a physical address of the memory 22 is obtained, the controller 4 cannot transmit information such as read data, a completion response, and an interrupt message, to the host 2. Therefore, if a command process corresponding to the I/O command is executed without considering the status of the address translation process, the information that cannot be transmitted to the host 2 may stay in the internal buffer 62 of the controller 4, and thereby the internal buffer 62 may be occupied with the information that cannot be transmitted to the host 2. In this case, not only is the command process of this I/O command delayed, but it is also impossible to fetch other I/O commands. This may cause a degradation in the performance of the I/O process in the SSD 3.

Therefore, the controller 4 adaptively controls the processing of the I/O command based on the status of the address translation process.

For example, when receiving a read command specifying a virtual address in the virtual address space of the host 2, the controller 4 starts a command process of reading read target data, which is specified by the read command, from the NAND memory 5.

The controller 4 also executes an address translation process of translating the virtual address specified by the read command to a physical address for accessing the memory 22 of the host 2.

When the address translation process succeeds, the controller 4 identifies a memory location in the memory 22, based on the physical address obtained in the address translation process. When the virtual address specified by the read command is a virtual address corresponding to a memory location in the memory 22 to which the read target data is to be transferred, the controller 4 identifies the memory location indicated by the obtained physical address as a memory location in the memory 22 to which the read target data is to be transferred. Note that when the size of the read target data specified by the read command is relatively large, the specified virtual address may be a virtual address corresponding to a memory location in the memory 22 where a list including a plurality of virtual addresses is stored. In this case, the controller 4 executes both a first address translation process and a second address translation process in order to identify memory locations in the memory 22 to which the read target data is to be transferred. The first address translation process is a process of translating the specified virtual address to a first physical address that indicates a memory location in the memory 22 where the list including the plurality of virtual addresses is stored. The second address translation process is a process of translating the plurality of virtual addresses included in the list to a plurality of second physical addresses of the memory 22, respectively. The controller 4 identifies a plurality of memory locations in the memory 22 indicated by the plurality of second physical addresses as memory locations in the memory 22 to which the read target data is to be transferred.

The controller 4 then transfers the data read from the NAND memory 5 to the identified one or more memory locations in the memory 22. In a case where a plurality of memory locations are identified, a plurality of data portions included in the data read from the NAND memory 5 are transferred to the plurality of memory locations, respectively.

On the other hand, when the address translation process fails, the controller 4 suspends the command process of reading the read target data from the NAND memory 5 until the address translation information required for the address translation process becomes obtainable. Then, when the address translation information becomes obtainable, the controller 4 resumes the command process.

For example, the controller 4 may suspend the command process when the controller 4 detects that a cache miss occurs. Alternatively, the controller 4 may suspend the command process when the controller 4 receives, from the host 2, a response indicating that the obtainment of the address translation information is failed, rather than when a cache miss occurs.

To suspend the command process, the controller 4 may stop a process of transmitting to the NAND memory 5 one or more instructions that have not yet been transmitted to the NAND memory 5 among a plurality of instructions necessary for reading the read target data specified by the read command. Assume, as an example, that it is necessary to transmit ten sense instructions to the NAND memory 5 to cause the NAND memory 5 to execute ten sense operations in order to read the read target data specified by one read command. For example, in a case where four sense instructions have already been transmitted to the NAND memory 5 and the remaining six sense instructions have not yet been transmitted to the NAND memory 5, the controller 4 does not transmit the remaining six sense instructions to the NAND memory 5. Data based on the four sense instructions that have already been transmitted to the NAND memory 5 are transferred from the NAND memory 5 to the controller 4. The controller 4 maintains this data in the internal buffer 62 and does not transmit this data to the host 2. When the command process is resumed, the controller 4 transmits the remaining six sense instructions to the NAND memory 5 and reads the remaining data among the read target data from the NAND memory 5. The controller 4 then transmits the data maintained in the internal buffer 62 and the remaining data read from the NAND memory 5 to the host 2.

By suspending the command process in this manner, it is possible to prevent the internal buffer 62 from being occupied for a long period of time by read data that cannot be transmitted to the host 2. Also, by suspending the command process, it is possible to prevent read data that cannot be transmitted to the host 2 from being transferred from the NAND memory 5 to the controller 4. This allows a peak value of the data traffic between the NAND memory 5 and the controller 4 to be lowered. Therefore, a peak value of power consumption of each of the NAND memory 5 and the controller 4 can also be lowered.

The controller 4 also executes an address translation process when transmitting to the host 2 first information (e.g., completion response or interrupt message). The first information is information for notifying the host 2 of completion of an I/O command. In this address translation process, a virtual address corresponding to a memory location in the memory 22 of the host 2 to which the first information is to be transferred is translated to a physical address for accessing the memory 22.

When this address translation process succeeds, the controller 4 transfers the first information to the memory 22 using the physical address obtained in the address translation process.

On the other hand, when the address translation process fails, the controller 4 suspends a first process of fetching another I/O command from a submission queue associated with a completion queue in which the completion response of this completed I/O command is to be stored until the address translation information necessary for the address translation process becomes obtainable, and resumes the first process after the address translation information becomes obtainable. As a result, it is possible to prevent a resource (e.g., SRAM 44) in the controller 4 from being occupied by the completion responses or the interrupt messages that cannot be transmitted to the host 2.

Next, a procedure of a series of processes for processing I/O commands will be described. FIG. 2 is a diagram illustrating a procedure of a series of processes for processing an I/O command, which is executed in the memory system according to the embodiment. FIG. 2 illustrates the procedure from when the host issues an I/O command to when the host 2 processes a completion response corresponding to this I/O command.

Step 1: The host 2 stores one or more new I/O commands to be transmitted to the SSD 3, in one or more free SQ slots in the submission queue (SQ). These one or more new I/O commands are stored in the one or more free SQ slots beginning with a slot indicated by a current value of a submission queue tail pointer (SQTP). The new I/O commands stored in the submission queue (SQ) may be write commands, read commands, or other I/O commands. In FIG. 2, each I/O command stored in the submission queue (SQ) is denoted as "CMD".

Step 2: To notify the controller 4 of the SSD 3 that one or more new I/O commands have been stored in the submission queue (SQ), the host 2 performs write access to a submission queue tail doorbell register in the SSD 3, the register corresponding to the submission queue (SQ), and updates a value of the submission queue tail pointer (SQTP) corresponding to the submission queue (SQ). The value of the submission queue tail pointer (SQTP) is incremented by the number of new I/O commands stored in the submission queue (SQ). Such updating of the submission queue tail pointer (SQTP) serves as a trigger that causes the controller 4 to start processing each of the I/O commands stored in the submission queue (SQ)

Step 3: The controller 4 can recognize the number of new I/O commands stored in the submission queue (SQ) from the difference between the new value of the submission queue tail pointer (SQTP) and the value of the submission queue head pointer (SQHP). The controller 4 fetches any given number of I/O commands, the any given number being one or more, from the submission queue (SQ). Each of the fetched I/O commands is temporarily stored in the SRAM 44 of the controller 4.

Step 4: The controller 4 updates the value of the submission queue head pointer (SQHP) corresponding to the submission queue (SQ) such that the value of the submission queue head pointer (SQHP) is incremented by the number of the I/O commands fetched at step 3.

Step 5: The controller 4 executes each of the fetched I/O commands. That is, the controller 4 executes a command process corresponding to each of the fetched I/O commands. An order in which command processes corresponding to these I/O commands are executed is not limited to a specific order, and these I/O commands may be processed in an order different from an order in which these I/O commands are fetched. In the command process corresponding to each of the I/O commands, the controller 4 executes data transfer from the memory 22 to the internal buffer 62 or data transfer from the internal buffer 62 to the memory 22, as needed.

Step 6: When a command process corresponding to a certain I/O command is completed, the controller 4 first updates the completion queue tail pointer (CQTP) corresponding to the completion queue (CQ) associated with the submission queue (SQ) from which this completed I/O command is fetched, and increments the value of the completion queue tail pointer (CQTP) by one.

Step 7: The controller 4 stores a new completion response indicating the status of this completed I/O command, in a next free CQ slot in this completion queue (CQ). In FIG. 2, each of the completion responses stored in the completion queue (CQ) is denoted as "CPL".

Step 8: The controller 4 transmits an interrupt message associated with the completion queue (CQ) in which the completion response is stored at step 7, to the host 2, thereby notifying the host 2 that a new completion response has been stored in this completion queue (CQ). In this case, the controller 4 transfers the interrupt message to the host 2 by transmitting to the host 2 a memory write request specifying a predetermined memory address of the memory 22. A memory location in the memory 22 to which the interrupt message is to be transferred may, for example, be pre-specified for each completion queue (CQ) by the host 2.

Step 9: The host 2 obtains one or more completion responses from a CQ slot in this completion queue (CQ), the CQ slot being indicated by the current value of the completion queue head pointer (CQHP), and processes the obtained one or more completion responses.

Step 10: The host 2 performs write accesses to a completion queue head doorbell register in the SSD 3, the register corresponding to this completion queue (CQ), and updates the value of the completion queue head pointer (CQHP). The value of the completion queue head pointer (CQHP) is incremented by the number of completion responses processed at step 9.

Next, an operation of accessing the memory 22 of the host 2 will be described. FIG. 3 is a diagram illustrating an operation of accessing a memory of a host which is executed in the memory system according to the embodiment, and an operation of accessing the memory of the host which is executed in a virtual machine of the host.

In the host 2, a virtual machine monitor (VMM) 211 is executed. The VMM 211 is software that creates one or more virtual machines on a computer that functions as the host 2. The VMM 211 operates each of the created virtual machines. In FIG. 3, the VMM 211 creates a virtual machine VM0 and a virtual machine VM1, and the virtual machine VM0 and the virtual machine VM1 are executed on the VMM 211. The operation of the virtual machine VM0 is controlled by a guest OS #0, which is an operating system executed on the VMM 211. The operation of the virtual machine VM1 is controlled by a guest OS #1, which is another operating system executed on the VMM 211.

The guest OS #0 of the virtual machine VM0 accesses the memory 22 using a guest physical address (GPA) in a guest physical address space (GPA space) allocated to the virtual machine VM0 by the VMM 211. The GPA space allocated to the virtual machine VM0 is a virtual address space used by the guest OS #0 to access the memory 22.

The guest OS #1 of the virtual machine VM1 accesses the memory 22 using a guest physical address (GPA) in a guest physical address space (GPA space) allocated to the virtual machine VM1 by the VMM 211. The GPA space allocated to the virtual machine VM1 is a virtual address space used by the guest OS #1 to access the memory 22.

In addition to the IOMMU 213, the host 2 includes a memory management unit (MMU) 212.

The MMU 212 translates a GPA included in a memory access request issued by the processor 21 (i.e., each of the guest OS #0 and the guest OS #1 in FIG. 3), to a host physical address (HPA). The HPA is a physical address for accessing the memory 22. The MMU 212 accesses the memory 22 using the HPA.

The IOMMU 213 translates a memory address included in a memory access request issued by the SSD 3, to an HPA. In other words, the memory address issued by the SSD 3 to access the memory 22 is a GPA in a GPA space used by a guest OS. Therefore, the IOMMU 213 translates the GPA included in the memory access request issued by the SSD 3 to an HPA. For example, in a case where the SSD 3 is associated with the virtual machine VM0 as an I/O device for the virtual machine VM0, the IOMMU 213 translates, based on the correspondence between the GPA space of the guest OS #0 and the HPA space of the memory 22, the GPA included in the memory access request issued by the SSD 3, to an HPA.

Here, a case in which a read command is issued from the guest OS #0 to the SSD 3 is described. The read command specifies a data pointer in addition to a start logical block address corresponding to read target data and a length of the read target data (the number of logical block addresses). The data pointer is information about a memory location in the memory 22 to which the read target data is to be transferred.

The memory 22 is logically divided into a plurality of memory locations referred to as memory pages. The size of each of the memory pages is set by the host 2. A minimum size of the memory page that can be set is, for example, 4 KiB.

The read command can specify one or more memory locations (memory pages) in the memory 22 to which the read target data is to be transferred by using a physical region page (PRP) entry, a PRP list, or a scatter gather list (SGL). Here, a case in which the read command uses the PRP entry is assumed. The read command includes a first PRP entry field (PRP1) and a second PRP entry field (PRP2). Each of the PRP1 and the PRP2 specifies a memory page using a PRP entry. The PRP entry is a pointer to the memory page. The PRP entry includes a page base address of the memory page and an offset within this memory page. The page base address is an address that identifies one memory page.

Since the guest OS #0 recognizes only the GPA space of the guest OS #0, each of the PRP1 and the PRP2 included in the read command issued by the guest OS #0 specifies a page base address of a memory page using a GPA in the GPA space of the guest OS #0.

The SSD 3 that has received the read command executes a command process corresponding to the received read command. Based on the received read command, the SSD 3 starts the command process of reading the read target data from the NAND memory 5. Then, with reference to the PRP1 and the PRP2 included in the received read command, the SSD 3 obtains one or two GPAs respectively corresponding to one or two memory pages to which the read target data is to be transferred. Note that, in a case where the size of the read target data is small, the read command may specify only one GPA corresponding to one memory page using only the PRP1.

To transfer the read target data read from the NAND memory 5 to the memory 22, the SSD 3 transmits a memory write request to the host 2, the memory write request specifying the obtained GPA. The memory write request is received by the IOMMU 213. In a case where the SSD 3 is an I/O device associated with the virtual machine VM0, the IOMMU 213 translates the GPA included in the memory write request to an HPA, based on the correspondence between the HPA space and the GPA space of the virtual machine VM0. The IOMMU 213 then writes the read target data to the memory 22 using the HPA. As a result, the read target data is stored in a memory location (memory page) in the memory 22, which is indicated by the HPA.

Next, the relationship between the GPA space and the HPA space will be described. FIG. 4 is a diagram illustrating the relationship between the GPA space and the HPA space used by the host. Here, similarly to a case illustrated in FIG. 3, a case in which two virtual machines (virtual machines VM0 and VM1) are executed in the host 2 is assumed.

For the virtual machine VM0, a GPA space #0 with a range of 0x000000 to 0x0FFFFF is allocated. Similarly, for the virtual machine VM1, a GPA space #1 with a range of 0x000000 to 0x0FFFFF is allocated. Here, 0x represents hexadecimal notation.

Each of these GPA spaces is a subset of the HPA space and is mapped to a specific range within the HPA space. In the example in FIG. 4, the GPA space #0 is, for example, mapped in a range 0x200000 to 0x2FFFFF in the HPA space. In this case, for example, 0x050000 in the GPA space #0 is translated to 0x250000 in the HPA space by the MMU 212 or the IOMMU 213. The GPA space #1 is mapped to, for example, a range 0x100000 to 0x1FFFFF in the HPA space. In this case, for example, 0x050000 in the GPA space #1 is translated to 0x150000 in the HPA space by the MMU 212 or the IOMMU 213.

Figure 5:
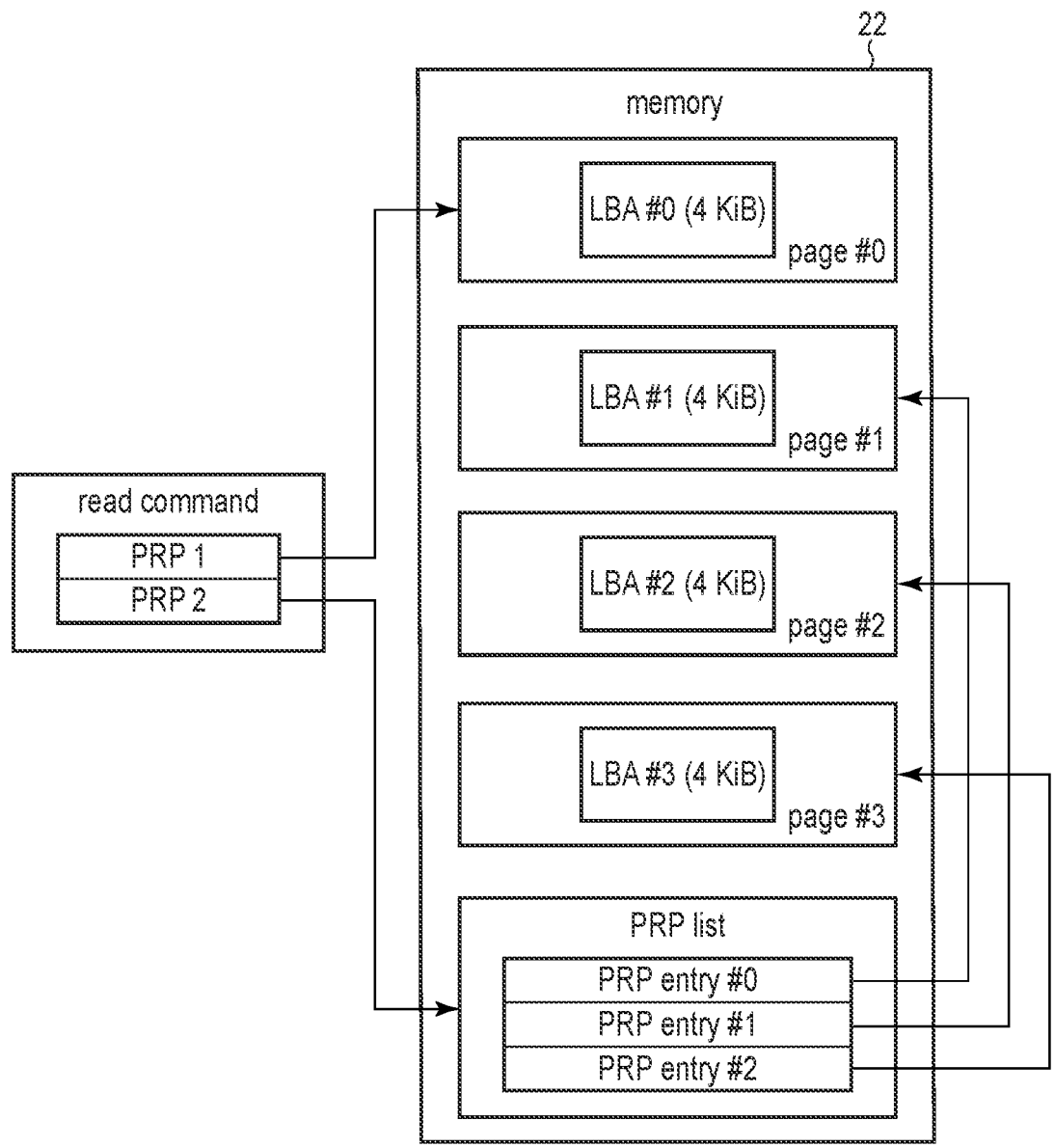
FIG. 5 is a diagram illustrating a physical region page (PRP) entry and a physical region page list (PRP list) which are specified by a read command issued to the memory system according to the embodiment.

Next, a PRP list specified in a read command will be described. FIG. 5 is a diagram illustrating a PRP entry and a PRP list which are specified by a read command issued to the memory system according to the embodiment.

In a case where the size of read target data is larger than the total size that can be described by using two PRP entry fields (PRP1 and PRP2) of the read command, i.e., larger than the size corresponding to two memory pages, at least one of the two PRP entry fields of the read command is used to specify a PRP list, which is a set of a plurality of PRP entries. The PRP list including the plurality of PRP entries is stored in one memory page. The PRP entry field specifying the PRP list indicates a page base address of a memory page where the PRP list is stored.

FIG. 5 exemplifies a case where the read command uses the PRP1 and the PRP2 to specify four memory pages in the memory 22 to which the read target data is to be transferred. In FIG. 5, the PRP1 included in the read command specifies one memory page. The PRP2 included in the read command specifies one memory page that stores the PRP list to specify three memory pages.

The PRP1 indicates a page base address of one memory page. Here, the PRP1 indicates the page base address of a memory page of page #0, for example.

The PRP2 indicates a page base address of another memory page that stores the PRP list. The memory page indicated by the PRP2 includes a plurality of PRP entries. Here, the memory page indicated by the PRP2 stores, for example, three PRP entries, i.e., PRP entries #0 to #2. The PRP entries #0 to #2 indicate, for example, page base addresses of three memory pages of pages #1 to #3, respectively.

Here, a case in which the read command specifies a start LBA as LBA #0 and data length as four LBAs is assumed. In a case where the data size corresponding to one LBA is 4KiB and the memory page size is 4KiB, four pieces of data corresponding to LBAs #0 to #3, each having a size of 4KiB, are to be transferred respectively to four memory pages corresponding to pages #0 to #3.

Note that, in the case where this read command is issued to the SSD 3 by the guest OS #0 or the guest OS #1, each of the PRP1 and the PRP2 uses a GPA to specify a certain memory page. That is, the address stored in the PRP1 of the read command indicates a GPA corresponding to the memory page of page #0. The address stored in the PRP2 of the read command indicates a GPA corresponding to the memory page that stores the PRP list.

Each of the plurality of PRP entries included in the PRP list also uses a GPA to indicate a certain memory page. For example, the address stored in the PRP entry #0 included in the PRP list indicates a GPA corresponding to the memory page of page #1. The address stored in the PRP entry #1 included in the PRP list indicates a GPA corresponding to the memory page of page #2. The address stored in the PRP entry #2 included in the PRP list indicates a GPA corresponding to the memory page of page #3.

Therefore, in order to access the three memory pages (pages #1 to #3), it is necessary to execute: (1) a process of translating the GPA indicated by the PRP2 to a HPA in the memory 22 and obtaining the PRP list from the memory 22; (2) a process of translating the GPA indicated by the PRP entry #0 included in the obtained PRP list to a HPA in the memory 22; (3) a process of translating the GPA indicated by the PRP entry #1 included in the obtained PRP list to a HPA in the memory 22; and (4) a process of translating the GPA indicated by the PRP entry #2 included in the obtained PRP list to a HPA in the memory 22.

Note that, similarly to the PRP entry fields (PRP1, PRP2) included in the read command, the PRP entry fields (PRP1, PRP2) included in a write command can also specify a memory page where a PRP list is stored.

Furthermore, for both read and write commands, the SGL can be used instead of the PRP list. The SGL also uses the same mechanism as the PRP list to allow more memory pages to be used for data transfer than the number of memory pages which can be described in a command alone.

Figure 6:
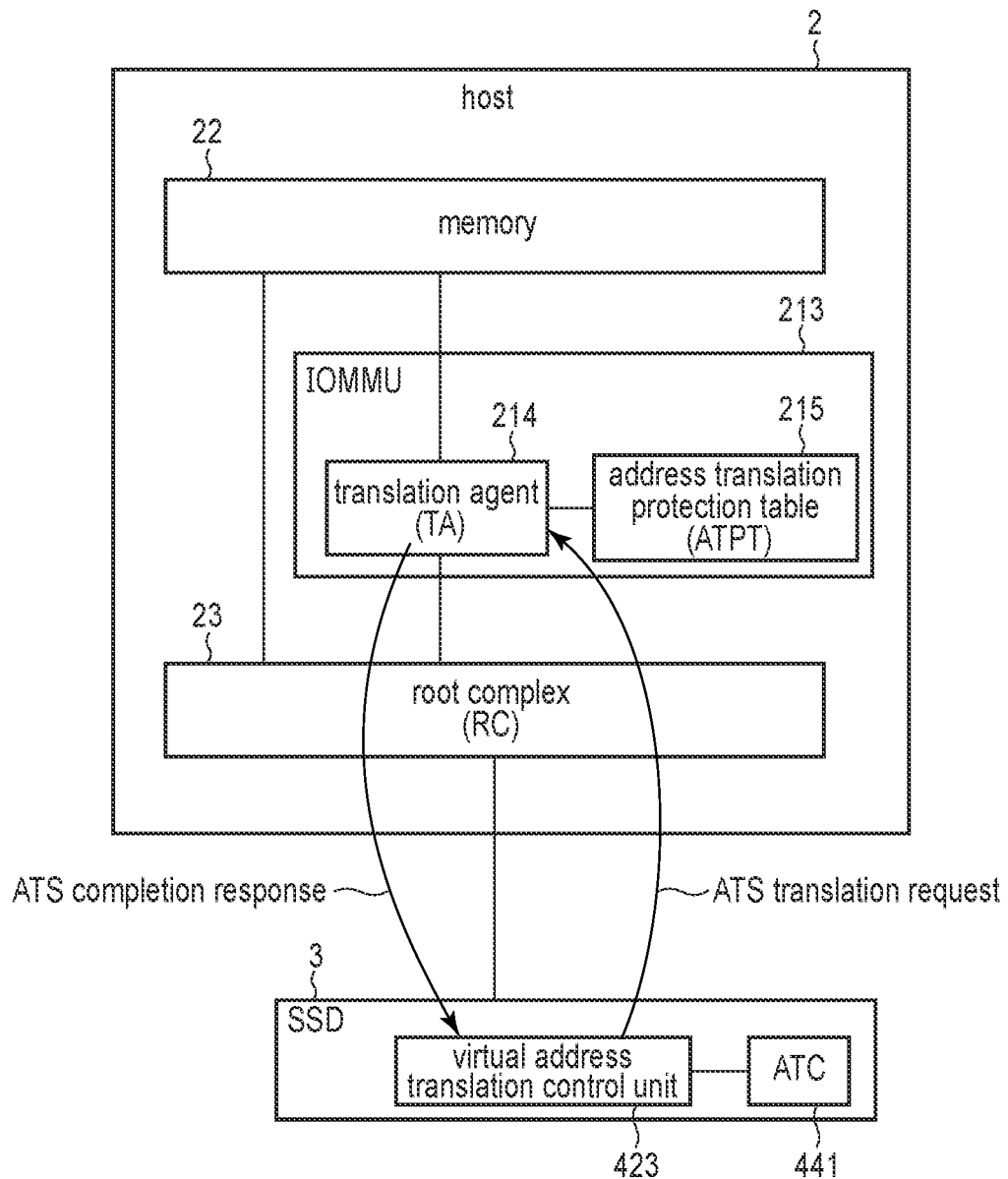
FIG. 6 is a diagram illustrating an address translation process executed in the memory system according to the embodiment.

Next, the address translation process will be described. FIG. 6 is a diagram illustrating an address translation process executed in the memory system according to the embodiment. The IOMMU 213 includes a translation agent (TA) 214 and an address translation protection table (ATPT) 215. The function of each part of the IOMMU 213 can be implemented by dedicated hardware, a processor that executes a program, or a combination of the dedicated hardware and the processor.

In a standard of PCIe, a function related to the IOMMU 213 is defined as an address translation service (ATS). The ATS is a protocol for performing communication related to address translation between the host 2 and the SSD 3. In the following, the address translation request described with reference to FIG. 1 is referred to as an ATS translation request. The ATS translation request is an address translation request to translate a virtual address to a physical address for accessing the memory 22.

In response to receiving the ATS translation request from the SSD 3 via the RC 23, the translation agent 214 executes an ATS translation process. The ATS translation process is a process that obtains the address translation information corresponding to the virtual address specified by the received ATS translation request, from the address translation protection table 215. In the ATS, the virtual address is defined as an untranslated address, and the physical address of the memory 22 is defined as a translated address. The virtual address is, for example, a GPA. The physical address is, for example, an HPA. Then, the translation agent 214 transmits an ATS completion response that includes the address translation information obtained from the address translation protection table 215, to the SSD 3 via the RC 23.

The address translation protection table 215 is a table that stores the address translation information.

When a virtual address specified by the host 2 (e.g., guest OS) is to be translated to a physical address of the memory 22, first, the virtual address translation control unit 423 searches the ATC 441 to determine whether or not address translation information corresponding to the virtual address is stored in the ATC 441. When the address translation information is not stored in the ATC 441, the virtual address translation control unit 423 transmits an ATS translation request specifying the virtual address, to the RC 23 of the host 2. When receiving the ATS translation request from the SSD 3, the RC 23 transmits the received ATS translation request to the translation agent 214.

The translation agent 214, which has received the ATS translation request, searches the address translation protection table 215 and determines whether or not address translation information corresponding to the virtual address specified by the ATS translation request is stored in the address translation protection table 215. When the address translation information is stored in the address translation protection table 215, the translation agent 214 obtains the address translation information from the address translation protection table 215. The address translation information obtained from the address translation protection table 215 includes a physical address corresponding to the virtual address specified by the ATS translation request, or both this physical address and the virtual address specified by the ATS translation request. The translation agent 214 transmits an ATS completion response that includes the obtained address translation information, to the virtual address translation control unit 423 via the RC 23. When the address translation information is not stored in the address translation protection table 215 or other errors have occurred, the translation agent 214 transmits an ATS completion response indicating that the ATS translation process fails, i.e., that obtainment of address translation information fails, to the virtual address translation control unit 423 via the RC 23.

When receiving the ATS completion response including the address translation information, the virtual address translation control unit 423 stores the physical address included in the address translation information of the received ATS completion response, or both the virtual address and the physical address included in the address translation information of the received ATS completion response, in the ATC 441.

When receiving, from the translation agent 214, the ATS completion response indicating that the obtainment of the address translation information failed, the virtual address translation control unit 423 transmits a page request to the RC 23 of the host 2. The page request is a message requesting preparation of the address translation information. When receiving the page request, the RC 23 notifies the received page request to, for example, the processor 21 or the VMM 211. This allows the host 2 (the processor 21 or the VMM 211) to start a process of preparing the address translation information in the address translation protection table 215. When the address translation information is prepared, the host 2 transmits a response to the virtual address translation control unit 423 via the RC 23. The response is a response to the page request and indicates that the preparation of the address translation information is completed. The virtual address translation control unit 423, which has received the response to the page request, transmits the ATS translation request to the translation agent 214 again.

Furthermore, when the address translation information in the address translation protection table 215 is changed by, for example, updating the correspondence between the GPA space and the HPA space, the translation agent 214 transmits an invalidation request to the virtual address translation control unit 423 via the RC 23. The invalidation request is a request for invalidating old address translation information stored in the ATC 441. The invalidation request specifies a specific range of the virtual address. The virtual address translation control unit 423, which has received the invalidation request, invalidates each entry in the ATC 441 where address translation information corresponding to each of the virtual addresses belonging to the specified range is stored.

Figure 7:
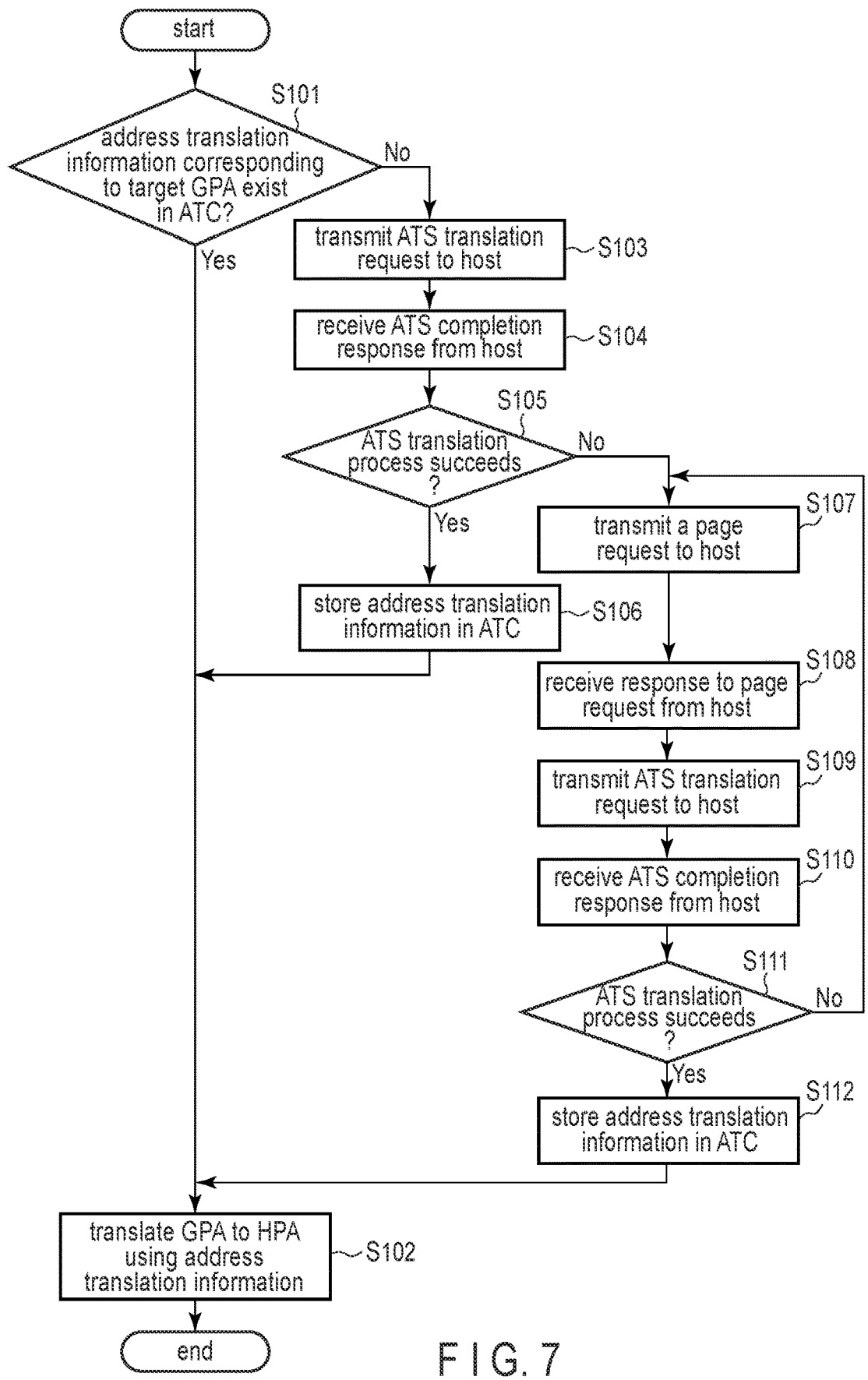
FIG. 7 is a flowchart illustrating a procedure of the address translation process executed in the memory system according to the embodiment.

Next, a procedure of the address translation process will be described. FIG. 7 is a flowchart illustrating a procedure of the address translation process executed in the memory system according to the embodiment. When a memory read request or a memory write request is to be transmitted to the host 2, the virtual address translation control unit 423 of the controller 4 starts the address translation process.

The virtual address translation control unit 423 searches the ATC 441 for address translation information necessary to translate a target GPA to a physical address (HPA) of the memory 22, then determines whether or not the address translation information corresponding to the target GPA exists in the ATC 441 (step S101).

When the address translation information corresponding to the target GPA exists in the ATC 441, that is, when a cache hit occurs in the ATC 441 (Yes at step S101), the virtual address translation control unit 423 obtains the address translation information from the ATC 441. The virtual address translation control unit 423 translates the target GPA to the HPA using the address translation information obtained from the ATC 441 (step S102).

When the address translation information corresponding to the target GPA does not exist in the ATC 441, that is, when a cache miss occurs in the ATC 441 (No at step S101), the virtual address translation control unit 423 transmits, to the host 2, an ATS translation request specifying the target GPA (step S103). The host 2, which has received the ATS translation request, executes the ATS translation process of obtaining, from the address translation protection table 215, address translation information corresponding to the specified GPA. When the ATS translation process is completed, the host 2 transmits an ATS completion response to the virtual address translation control unit 423. When obtainment of the address translation information succeeds, the host 2 transmits, to the virtual address translation control unit 423, an ATS completion response including the address translation information and a status indicating success of the obtainment of the address translation information, i.e., success of the ATS translation process. On the other hand, when the obtainment of the address translation information fails, the host 2 transmits, to the virtual address translation control unit 423, an ATS completion response including a status indicating failure of the obtainment of the address translation information, i.e., failure of the ATS translation process.

The virtual address translation control unit 423 receives the ATS completion response from the host 2 (step S104).

The virtual address translation control unit 423 determines whether or not the received ATS completion response includes a status indicating success (step S105).

When the received ATS completion response includes a status indicating success (Yes at step S105), the virtual address translation control unit 423 stores the address translation information included in the received ATS completion response in the ATC 441 (step S106).

The virtual address translation control unit 423 translates the target GPA to the HPA using the address translation information received at step S104 (step S102).

When the received ATS completion response includes a status indicating failure (No at step S105), the virtual address translation control unit 423 transmits a page request to the host 2 (step S107). The host 2, which has received the page request, starts a process of preparing address translation information corresponding to the GPA specified by the page request. In the process of preparing the address translation information, the host 2 prepares the address translation information corresponding to the GPA specified by the page request in the address translation protection table 215. When the process of preparing the address translation information is completed, the host 2 transmits a response to the page request, to the virtual address translation control unit 423.

The virtual address translation control unit 423 receives the response to the page request from the host 2 (step S108).

The virtual address translation control unit 423 transmits the ATS translation request specifying the target GPA to the host 2 again (step S109). The host 2, which has received the ATS translation request, executes the ATS translation process of obtaining the address translation information corresponding to the specified GPA from the address translation protection table 215. The address translation information corresponding to the specified GPA has already been prepared in the address translation protection table 215. Therefore, the ATS translation process is assumed to be successful. When the ATS translation process is completed, the host 2 transmits, to the virtual address translation control unit 423, an ATS completion response including the address translation information and a status indicating success.

The virtual address translation control unit 423 receives the ATS completion response from the host 2 (step S110).

The virtual address translation control unit 423 determines whether or not the received ATS completion response includes a status indicating success (step S111).

When the received ATS completion response includes the status indicating success (Yes at step S111), the virtual address translation control unit 423 stores the address translation information included in the received ATS completion response in the ATC 441 (step S112).

The virtual address translation control unit 423 translates the target GPA to the HPA using the address translation information included in the received ATS completion response (step S102).

If the received ATS completion response includes a status indicating failure (No at step S111) for some reason, the virtual address translation control unit 423 transmits the page request to the host 2 again (step S107).

Thus, in performing the address translation process, time required for the address translation process differs among (A) a case where the address translation information can be obtained from the ATC 441, (B) a case where the address translation information can be obtained by transmitting an ATS translation request, and (C) a case where the address translation information can be obtained by transmitting the ATS translation request again after transmitting a page request. Accordingly, in the SSD 3 according to the embodiment, the command process is controlled according to the status of the address translation process.

First, the control of a command process for a read command will described. FIG. 8 is a sequence diagram illustrating a first example of a procedure of a command process for a read command, which is executed in the memory system according to the embodiment. In FIG. 8, a case in which a PRP list is specified by a PRP entry field included in the read command, i.e., the PRP entry field indicates a GPA corresponding to a memory location (memory page) where the PRP list is stored, is assumed. Furthermore, in FIG. 8, a case in which a cache hit occurs in all address translation processes, is assumed.

In a command fetch process, the front end (FE) of the controller 4 issues an I/O command fetch request using a GPA (step S201). This GPA is a virtual address corresponding to an SQ slot of a submission queue (SQ) from which an I/O command is to be fetched. The FE of the controller 4 passes the issued fetch request to the virtual address translation control unit 423.

The virtual address translation control unit 423 searches the ATC 441 for address translation information corresponding to the GPA included in the fetch request received from the FE (step S202). When the address translation information corresponding to this GPA is stored in the ATC 441 (cache hit), the virtual address translation control unit 423 obtains the address translation information from the ATC 441 and translates the GPA to an HPA using the obtained address translation information (step S203).

The command fetch unit 421 issues a memory read request of fetching the I/O command from the memory 22, using the HPA translated by the virtual address translation control unit 423 (step S204). In the following, the memory read request is referred to as a DMA read request. At step S204, the command fetch unit 421 transmits, to the RC 23 of the host 2, the DMA read request that includes the translated HPA. On the basis of the HPA included in the DMA read request received from the controller 4, the RC 23 reads the I/O command (in this case, a read command) from the SQ slot of the memory 22 and transmits the read command, which is read from the SQ slot, to the controller 4 as a response to the DMA read request. In this manner, the FE receives the read command from the host 2 (step S205). The received read command is passed from the FE to the BE. The BE starts a command process for reading read target data specified by the read command, from the NAND memory 5. Then, the FE moves to a data transfer process.

In the data transfer process, the FE issues a fetch request for the PRP list, using the GPA included in the PRP entry field of the received read command (step S206). The FE passes the issued fetch request to the virtual address translation control unit 423.

The virtual address translation control unit 423 searches the ATC 441 for address translation information corresponding to the GPA included in the fetch request received from the FE (step S207). When the address translation information corresponding to this GPA is stored in the ATC 441 (cache hit), the virtual address translation control unit 423 obtains the address translation information from the ATC 441 and translates this GPA to an HPA using the obtained address translation information (step S208).

The command fetch unit 421 issues a DMA read request for fetching the PRP list from the memory 22, using the HPA translated by the virtual address translation control unit 423 (step S209). At step S209, the command fetch unit 421 transmits, to the RC 23 of the host 2, the DMA read request that includes the translated HPA. On the basis of the HPA included in the DMA read request received from the controller 4, the RC 23 reads the PRP list from the memory 22 and transmits the read PRP list to the controller 4 as a response corresponding to the DMA read request. In this manner, the FE of the controller 4 receives the PRP list from the host 2 (step S210).

The PRP list includes a plurality of GPAs, the plurality of GPAs respectively corresponding to a plurality of memory locations in the memory 22 to which read data is to be transferred. The FE executes, for each of the GPAs included in the PRP list, the following process.

The FE selects one GPA from the plurality of GPAs included in the PRP list. The FE issues a transfer request for transferring read data to the memory 22 using the selected GPA (step S211). The FE passes the issued transfer request to the virtual address translation control unit 423.

The virtual address translation control unit 423 searches the ATC 441 for address translation information corresponding to the GPA included in the transfer request received from the FE (step S212). When a cache hit occurs, the virtual address translation control unit 423 translates the GPA to an HPA using the address translation information in the ATC 441 (step S213).

The DMAC 43 issues a memory write request for transferring the read data to the memory 22, using the HPA translated by the virtual address translation control unit 423

(step S214). In the following, the memory write request is referred to as a DMA write request. At step S214, the DMAC 43 transmits, to the RC 23 of the host 2, a DMA write request that includes the translated HPA and the read data. When receiving the DMA write request from the controller 4, the RC 23 stores the read data included in the received DMA write request in a memory location in the memory 22. The memory location is indicated by the HPA included in the received DMA write request. To execute the transfer process for all the read data, the controller 4 executes the processes from step S211 to step S214 as many times as the number of GPAs included in the PRP list. When the transfer processes for all the read data are completed, the FE moves to a completion response transfer process.

In the completion response transfer process, the FE issues a transfer request for transferring a completion response to the memory 22, using a GPA (step S215). This GPA is a GPA corresponding to a memory location in the memory 22 to which this completion response is to be transferred, i.e., a GPA corresponding to a next free CQ slot of a completion queue (CQ) associated with the SQ from which the completed read command has been fetched. The FE passes the issued transfer request to the virtual address translation control unit 423.

The virtual address translation control unit 423 searches the ATC 441 for address translation information corresponding to the GPA included in the transfer request received from the FE (step S216). When a cache hit occurs, the virtual address translation control unit 423 translates the GPA to an HPA using the address translation information in the ATC 441 (step S217).

The DMAC 43 issues a DMA write request for transferring the completion response to the memory 22, using the HPA translated by the virtual address translation control unit 423 (step S218). At step S218, the DMAC 43 transmits, to the RC 23 of the host 2, the DMA write request. The DMA write request includes the translated HPA and the completion response. When receiving the DMA write request from the controller 4, the RC 23 stores the completion response included in the received DMA write request in a memory location in the memory 22. The memory location is indicated by the HPA included in the received DMA write request. The FE then moves to an interrupt transmission process.

In the interrupt transmission process, the FE issues a transmission request for transmitting an interrupt message to the memory 22, using a GPA (step S219). This GPA is a GPA corresponding to a memory location in the memory 22 where the interrupt message is to be transmitted. The interrupt message includes an interrupt vector associated with a completion queue (CQ) where the completion response was stored at step S218. The FE passes the issued transmission request to the virtual address translation control unit 423.

The virtual address translation control unit 423 searches the ATC 441 for address translation information corresponding to the GPA included in the transmission request received from the FE (step S220). When a cache hit occurs, the virtual address translation control unit 423 translates the GPA to an HPA using the address translation information in the ATC 441 (step S221).

The DMAC 43 issues a DMA write request for transmitting the interrupt message to the memory 22, using the HPA translated by the virtual address translation control unit 423 (step S222). At step S222, the DMAC 43 transmits, to the RC 23 of the host 2, the DMA write request. The DMA write request includes the translated HPA and the interrupt message. When receiving the DMA write request from the controller 4, the RC 23 stores the interrupt message included in the received DMA write request in a memory location in the memory 22. The memory location is indicated by the HPA included in the received DMA write request. Then, the series of processing for the read command is ended.

Figure 9:
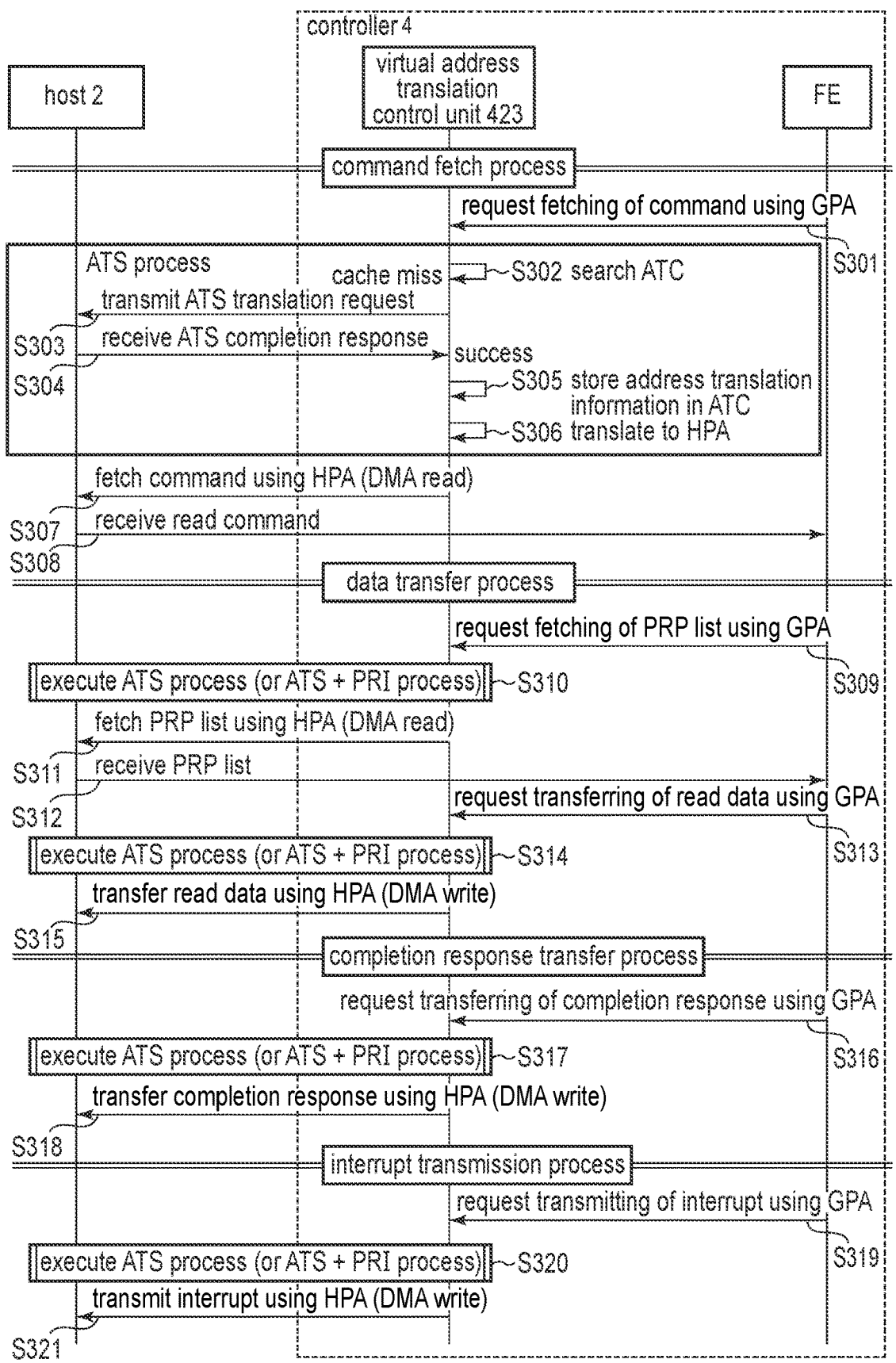
FIG. 9 is a sequence diagram illustrating a second example of a procedure of a command process for a read command, which is executed in the memory system according to the embodiment.

Next, a case in which a cache miss occurs in the ATC 441 will be described. FIG. 9 is a sequence diagram illustrating a second example of a procedure of a command process for a read command, which is executed in the memory system according to the embodiment.

In a command fetch process, the controller 4 executes processes from step S301 to step S302. The processes from step S301 to step S302 are the same as the processes from step S201 to step S202 described in FIG. 8. When a cache miss occurs in the ATC 441 at step S302, the virtual address translation control unit 423 transmits, to the host 2, an ATS translation request specifying the GPA included in the fetch request received from the FE (step S303). The host 2 searches the address translation protection table 215 for address translation information corresponding to the GPA which is an untranslated address specified by the ATS translation request received from the controller 4. When the address translation information can be obtained from the address translation protection table 215, the host 2 transmits, to the controller 4, an ATS completion response including the obtained address translation information and a status indicating the success of the ATS translation process.

The virtual address translation control unit 423 receives the ATS completion response from the host 2 (step S304).

Since the ATS translation process has succeeded, the virtual address translation control unit 423 stores the address translation information included in the received ATS completion response in the ATC 441 (step S305).

The virtual address translation control unit 423 translates the GPA to an HPA using this address translation information (step S306). Processes from step S302 to step S306 are collectively referred to as an ATS process.

The virtual address translation control unit 423 executes processes from step S307 to step S308. The processes from step S307 to step S308 are the same as the processes from step S204 to step S205 described in FIG. 8. The FE then moves to a data transfer process.

In the data transfer process, the FE issues a fetch request for the PRP list using a GPA included in the PRP entry field of the obtained read command (step S309). The FE passes the issued fetch request to the virtual address translation control unit 423.

Then, when a cache miss occurs in the ATC 441, the virtual address translation control unit 423 executes an ATS process (or an ATS+page request interface (PRI) process described later) (step S310). The ATS process executed at step S310 is the same as the ATS process described at steps S302 to step S306. The ATS+PRI process executed at step S310 is a process executed in the case where the ATS translation process in the ATS process has failed.

When an HPA corresponding to a memory location where the PRP list is stored is obtained in the ATS process (or the ATS+PRI process), the controller 4 executes the processes from step S311 to step S313. The processes from step S311 to step S313 are the same as the processes from step S209 to step S211 described in FIG. 8.

When a cache miss occurs in the ATC 441 in the ATC search process that searches for address translation information corresponding to a GPA selected from the PRP list, the virtual address translation control unit 423 executes the ATS process (or the ATS+PRI process) (step S314).

The DMAC 43 executes a process of step S315 using the HPA obtained in the ATS process (or the ATS+PRI process) executed at step S314. The process executed at step S315 is the same as the process executed at step S214 described in FIG. 8. When the transfer processes of all the read data are completed, the FE moves to a completion response transfer process.

In the completion response transfer process, the FE issues a transfer request for transferring a completion response to the memory 22, using a GPA corresponding to a next free CQ slot in the completion queue (CQ) (step S316).

When a cache miss occurs in the ATC 441 in the ATC search process that searches for address translation information corresponding to the GPA included in this transfer request, the virtual address translation control unit 423 executes the ATS process (or the ATS+PRI process) (step S317).

The DMAC 43 executes a process of step S318 using an HPA obtained in the ATS process (or the ATS+PRI process) executed at step S317. The process executed at step S318 is the same as the process executed at step S218 described in FIG. 8. The FE then moves to an interrupt transmission process.

In the interrupt transmission process, the FE issues a transmission request for transmitting an interrupt message to the memory 22, using a GPA corresponding to a memory location where the interrupt message is to be transmitted (step S319).

When a cache miss occurs in the ATC 441 in the ATC search process that searches for address translation information corresponding to the GPA included in this transmission request, the virtual address translation control unit 423 executes the ATS process (or the ATS+PRI process) (step S320).

The DMAC 43 executes a process of step S321 using an HPA obtained in the ATS process (or the ATS+PRI process) executed at step S320. The process executed at step S321 is the same as the process executed at step S222 described in FIG. 8.

Figure 10:
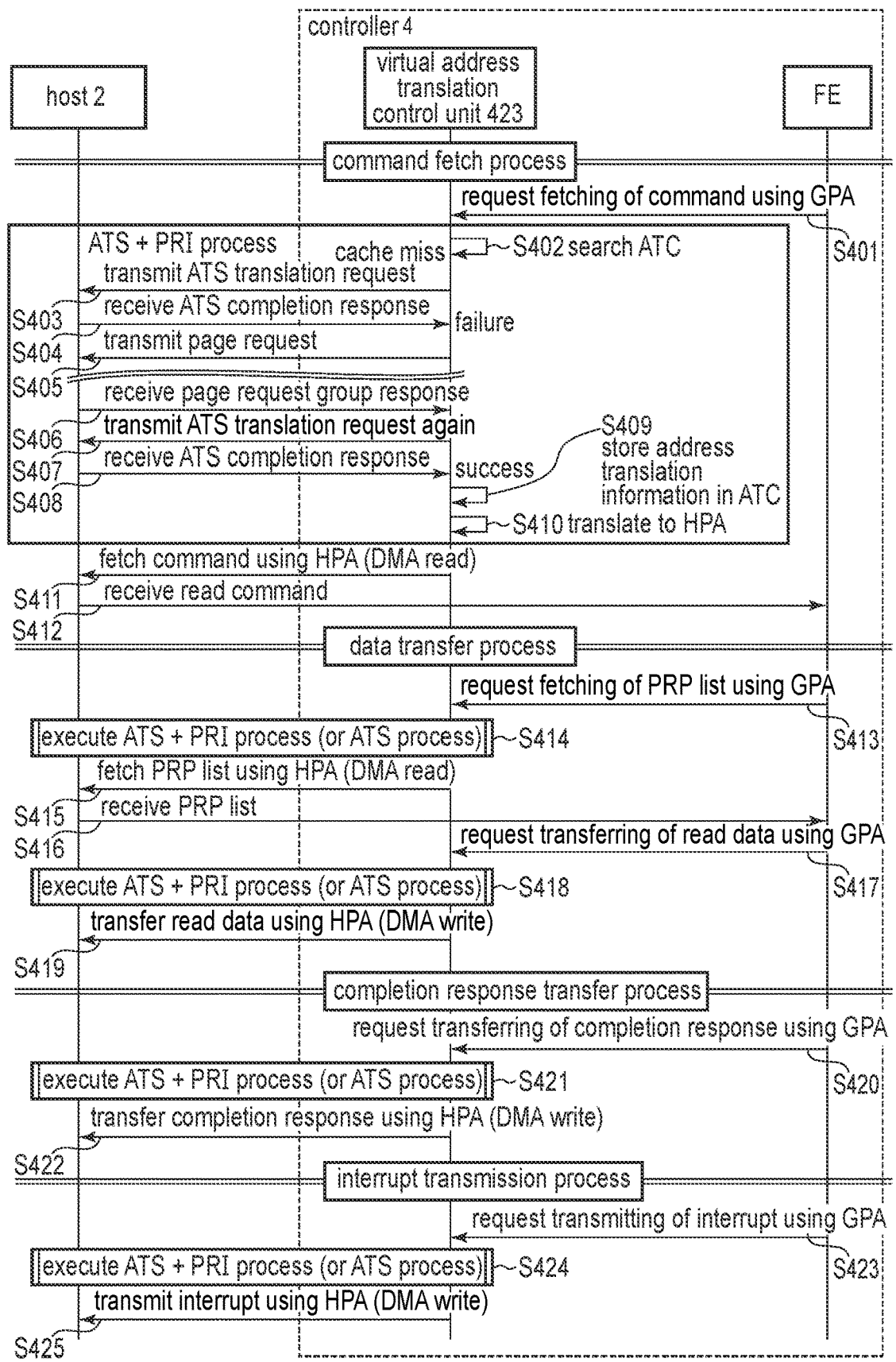
FIG. 10 is a sequence diagram illustrating a third example of a procedure of a command process for a read command, which is executed in the memory system according to the embodiment.

Next, a command process for a read command in a case where the ATS translation process fails will be described. FIG. 10 is a sequence diagram illustrating a third example of a procedure of a command process for a read command, which is executed in the memory system according to the embodiment.

In a command fetch process, the controller 4 executes processes from step S401 to step S402. The processes from step S401 to step S402 are the same as the processes from step S201 to S202 described in FIG. 8. When a cache miss occurs in the ATC 441 at step S402, the virtual address translation control unit 423 executes a process of step S403. The process executed at step S403 is the same as the process executed at step S303 described in FIG. 9.

When receiving an ATS translation request from the controller 4, the host 2 searches the address translation protection table 215 for address translation information corresponding to the GPA specified by the ATS translation request. Here, a case in which the host 2 is unable to obtain the address translation information corresponding to the specified GPA is assumed. In this case, the host 2 transmits, to the controller 4, an ATS completion response including a status indicating failure of the ATS translation process. Therefore, the virtual address translation control unit 423 receives, from the host 2, the ATS completion response including the status indicating the failure of the ATS translation process (step S404).

The virtual address translation control unit 423 transmits, to the host 2, a page request for requesting preparation of the address translation information (step S405). The host 2, which has received the page request, starts the process of preparing the address translation information corresponding to the GPA specified in the page request, in the address translation protection table 215. When the process of preparing the address translation information in the address translation protection table 215 is completed, the host 2 transmits, to the virtual address translation control unit 423, a page request group response, which is a response indicating that the preparation of the address translation information is completed.

The virtual address translation control unit 423 receives the page request group response (step S406).

When receiving the page request group response, the virtual address translation control unit 423 transmits the ATS translation request to the host 2 again (step S407). The ATS translation request transmitted at step S407 specifies the same GPA as that specified by the ATS translation request transmitted at step S403. The host 2, which has received the ATS translation request, searches the address translation protection table 215 and obtains the address translation information corresponding to the specified GPA. The host 2 transmits, to the virtual address translation control unit 423 of the controller 4, an ATS completion response that includes the obtained address translation information and the status indicating the success of the ATS translation process.

The virtual address translation control unit 423 receives the ATS completion response from the host 2 (step S408).

Since the ATS translation process has succeeded, the virtual address translation control unit 423 stores the address translation information included in the received ATS completion response, in the ATC 441 (step S409).

The virtual address translation control unit 423 translates the GPA to an HPA using this address translation information (step S410). The processes from step S402 to step S410 are collectively referred to as an ATS+PRI process.

Thus, in the ATS+PRI process, in addition to the ATS process, a process of transmitting a page request to the host 2 and a process of transmitting the ATS translation request again to the host 2 after a page request group response is received from the host 2 are executed.

After the ATS+PRI process is completed, the controller 4 executes processes from step S411 to step S412. The processes from step S411 to step S412 are the same as the processes from step S307 to S308 described in FIG. 9.

The subsequent processes from step S413 to step S425 are the same as the processes from step S309 to step S321 described in FIG. 9. In each of step S414, step S418, step S421, and step S424, if the ATS translation process fails, then the ATS+PRI process is executed.

Figure 11:
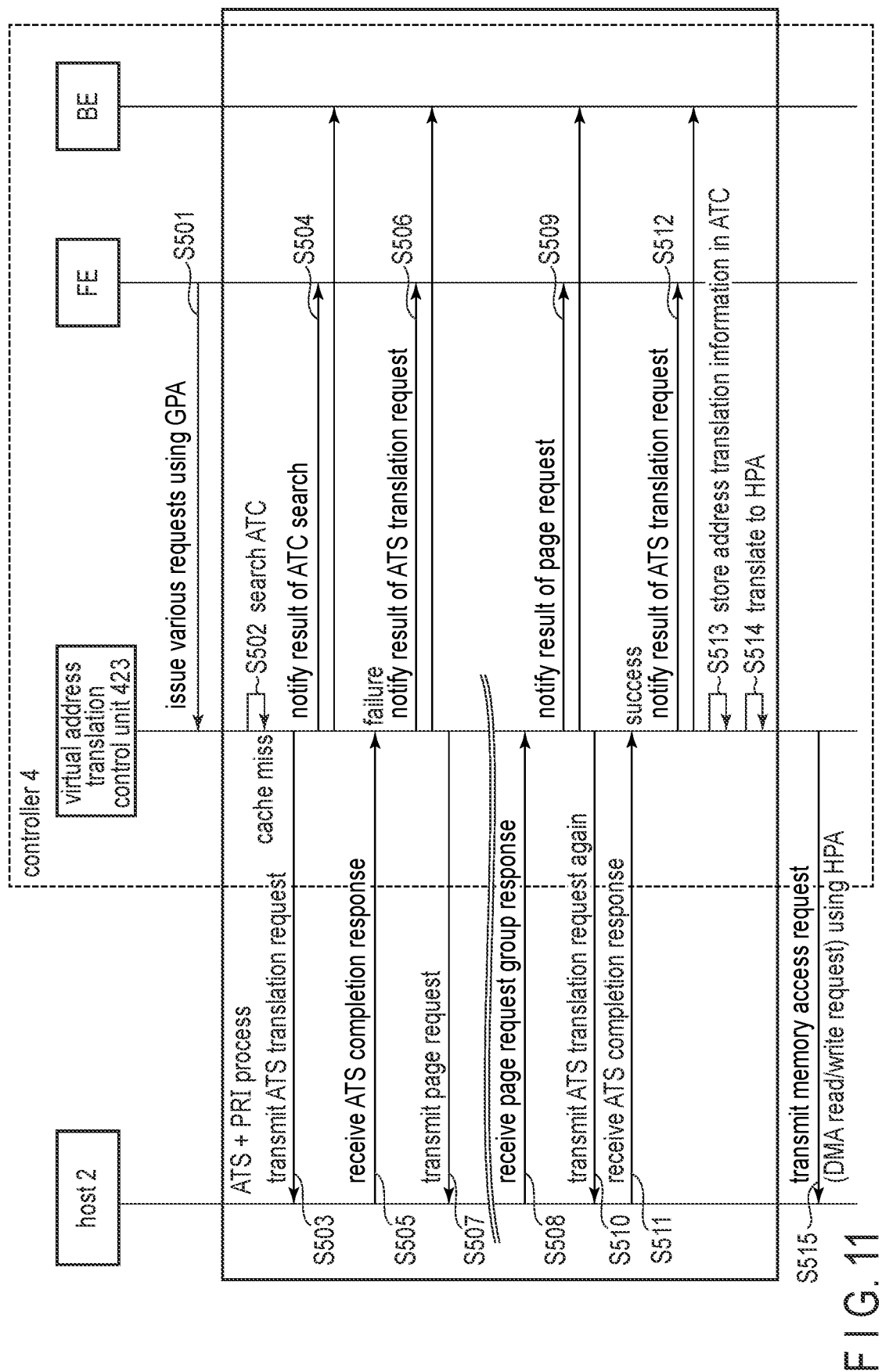
FIG. 11 is a sequence diagram illustrating a procedure of an address translation process executed in the memory system according to the embodiment.

Next, a process of notifying the FE and the BE of a status of the address translation process from the virtual address translation control unit 423 will be described. FIG. 11 is a sequence diagram illustrating a procedure of an address translation process executed in the memory system according to the embodiment. In FIG. 11, a case in which the ATS+PRI process is executed in the address translation process is assumed.

In each of the command fetch process, the data transfer process, the completion response transfer process, and the interrupt transmission process, the controller 4 executes the following processes.

The FE of the controller 4 issues each of various requests (e.g., command fetch requests, PRP list fetch requests, data transfer requests, completion response transfer requests, and interrupt message transmission requests) using a GPA (step S501).

The virtual address translation control unit 423 searches the ATC 441 for address translation information corresponding to the GPA included in each of the various requests received from the FE (step S502). When a cache miss occurs in the ATC 441, the virtual address translation control unit 423 transmits, to the host 2, an ATS translation request specifying the GPA (step S503).

After transmitting the ATS translation request, the virtual address translation control unit 423 notifies at least one of the FE and the BE of the controller 4 that a cache miss has occurred in the ATC 441, as a result of the ATC search (step S504).

Then, when receiving an ATS completion response including a status indicating failure from the host 2 (step S505), the virtual address translation control unit 423 notifies at least one of the FE and the BE that the ATS translation process has failed, as a result of the ATS translation request (step S506).

After receiving, from the host 2, the ATS completion response including the status indicating failure, the virtual address translation control unit 423 transmits a page request to the host 2 (step S507).

When receiving a page request group response from the host 2 (step S508), the virtual address translation control unit 423 notifies at least one of the FE and the BE of the controller 4 that the preparation of the address translation information has been completed, as a result of the page request (step S509).

Then, the virtual address translation control unit 423 transmits the ATS translation request to the host 2 again (step S510). The host 2, which has received the ATS translation request, obtains, from the address translation protection table 215, the address translation information corresponding to the specified GPA. The host 2 transmits, to the virtual address translation control unit 423, an ATS completion response including the obtained address translation information and a status indicating success.

When receiving the ATS completion response from the host 2 (step S511), the virtual address translation control unit 423 notifies at least one of the FE and the BE of the controller 4 that the ATS translation process has succeeded, as a result of the ATS translation request (step S512).

The virtual address translation control unit 423 stores the address translation information included in the received ATS completion response, in the ATC 441 (step S513) and translates the GPA to an HPA using this address translation information (step S514).

Then, the command fetch unit 421 or the DMAC 43 transmits a memory access request (DMA read/write request) to the host 2, using the HPA translated by the virtual address translation control unit 423 (step S515).

Thus, by using a mechanism of notifying at least one of the FE and the BE, of the status of the address translation process from the virtual address translation control unit 423, the controller 4 can recognize the status of the address translation process.

Note that, in FIG. 11, at step S503 and step S504, a case in which the virtual address translation control unit 423 notifies the ATC search result after issuing the ATS translation request is described. However, the virtual address translation control unit 423 may notify the ATC search result at the same time or before issuing the ATS translation request. Also, at step S506 and step S507, a case in which a page request is transmitted after notifying the result of the ATS translation request is described. However, the virtual address translation control unit 423 may issue the page request at the same time or before notifying the result of the ATS translation request. Also, at step S509 and step S510, a case in which the virtual address translation control unit 423 transmits the ATS translation request again after notifying the result of the page request is described. However, the virtual address translation control unit 423 may notify the result of the page request at the same time or after the ATS translation request is transmitted again.

Figure 12:
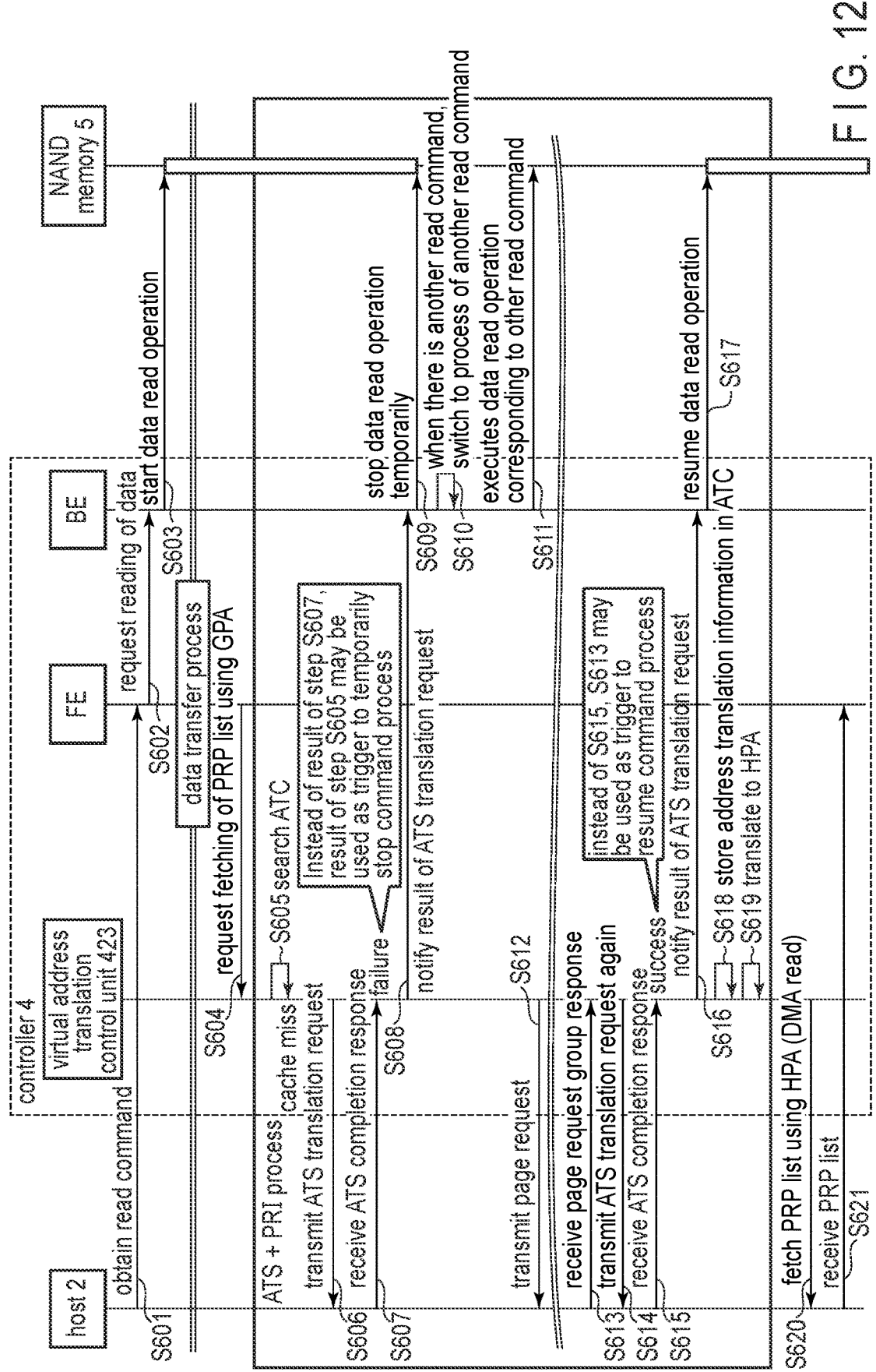
FIG. 12 is a sequence diagram illustrating an example of a procedure of an operation of suspending a command process of reading data from the nonvolatile memory, the operation of suspending being executed in the memory system according to the embodiment.

Next, an operation of suspending a command process corresponding to a read command on the basis of the status of the address translation process in the data transfer process will be described. FIG. 12 is a sequence diagram illustrating an example of a procedure of an operation of suspending a command process of reading data from the nonvolatile memory, the operation of suspending being executed in the memory system according to the embodiment. FIG. 12 illustrates a case in which failure of the ATS translation process in the data transfer process is used as a trigger to suspend the command process.

The FE obtains a read command from the host 2 by executing the command fetch process described in FIG. 8, FIG. 9, or FIG. 10 (step S601).

The FE requests the BE to execute a data read operation for reading read target data from the NAND memory 5 (step S602). The read target data is data specified by the obtained read command.

The BE starts the data read operation to execute a command process corresponding to the obtained read command (step S603). In the data read operation, the BE first transmits, to the NAND memory 5, a sense instruction for causing the NAND memory 5 to execute a sense operation of transferring at least part of the read target data from the memory cell array 51 to the page buffer 52. The BE waits until the sense operation in the NAND memory 5 is completed. When the sense operation in the NAND memory 5 is completed, the BE transmits, to the NAND memory 5, one or more data-out instructions for causing the NAND memory 5 to execute one or more data-out operations. When all the data stored in the page buffer 52 has been transferred to the controller 4 by the one or more data-out operations, the BE transmits, to the NAND memory 5, another sense instruction for causing the NAND memory 5 to execute another sense operation of transferring at least part of remaining data of the read target data from the memory cell array 51 to the page buffer 52. Thus, in the data read operation, the BE transmits, to the NAND memory 5, a plurality of instructions necessary for reading the read target data (i.e., a plurality of sense instructions and a plurality of data-out instructions).

After requesting the BE to execute the data read operation, the FE issues a fetch request for a PRP list, using a GPA included in the PRP entry field of the obtained read command (step S604). The FE passes the issued fetch request to the virtual address translation control unit 423.

The virtual address translation control unit 423 searches the ATC 441 for address translation information corresponding to the GPA included in the fetch request received from the FE (step S605).

When a cache miss occurs in the ATC 441, the virtual address translation control unit 423 transmits, to the host 2, an ATS translation request specifying the GPA included in the fetch request (step S606).

When receiving an ATS completion response including a status indicating failure from the host 2 (step S607), the virtual address translation control unit 423 notifies the BE that the ATS translation process has failed, as a result of the ATS translation request (step S608).

When notified that the ATS translation process has failed, the BE suspends the command process corresponding to the read command by temporarily stopping the data read operation in progress (step S609). At step S609, for example, the BE temporarily stops a process of transmitting each of instructions to the NAND memory 5, the instructions being one or more instructions that have not yet been transmitted to the NAND memory 5 among the plurality of instructions necessary for reading the read target data specified by the obtained read command.

At this time, when there is another read command received from the host 2, the BE may switch an operation to be executed to a data read operation corresponding to said another read command (step S610), and may execute the data read operation corresponding to said another read command (step S611). This allows the BE to execute the data read operation corresponding to said another read command in preference to the read command for which the ATS translation process has failed.

Then, after notifying the BE of the result of the ATS translation request at step S608, the virtual address translation control unit 423 transmits, to the host 2, a page request for requesting the preparation of address translation information (step S612). The host 2, which has received the page request, starts the process of preparing the address translation information. When the process of preparing the address translation information is completed, the host 2 transmits, to the virtual address translation control unit 423, a page request group response, which is a response indicating that the preparation of the address translation information is completed.

When receiving the page request group response from the host 2 (step S613), the virtual address translation control unit 423 transmits the ATS translation request to the host 2 again (step S614). This ATS translation request specifies the same GPA as the GPA specified in the ATS translation request transmitted at step S606. The host 2, which has received the ATS translation request, searches the address translation protection table 215 to obtain the address translation information corresponding to the specified GPA. The host 2 transmits, to the virtual address translation control unit 423 of the controller 4, an ATS completion response including the obtained address translation information and a status indicating success.

When receiving the ATS completion response including the address translation information and the status indicating success from the host 2 (step S615), the virtual address translation control unit 423 notifies the BE that the ATS translation process has succeeded, as a result of the ATS translation request (step S616).

The BE, which has received the notification, resumes the suspended command process by resuming the data read operation that was temporarily stopped at step S609 (step S617). At step S617, the BE starts a process of transmitting, to the NAND memory 5, the one or more instructions that have not yet been transmitted to the NAND memory 5 among the plurality of instructions necessary for reading the read target data corresponding to the suspended read command from the NAND memory 5.

The virtual address translation control unit 423 stores the address translation information included in the ATS completion response received at step S615 in the ATC 441 (step S618).

The virtual address translation control unit 423 translates the GPA to an HPA using this address translation information (step S619).

The command fetch unit 421 fetches the PRP list from the memory 22 using the HPA translated by the virtual address translation control unit 423 (step S620). At step S620, the command fetch unit 421 transmits, to the RC 23 of the host 2, a DMA read request that includes the HPA translated by the virtual address translation control unit 423. On the basis of the HPA included in the DMA read request received from the controller 4, the RC 23 reads the PRP list from the memory 22, and transmits the read PRP list to the controller 4. The FE thus receives the PRP list from the host 2 (step S621).

In the data transfer process, in a case where the ATS translation process fails, it takes a longer time to obtain the address translation information than in a case where the ATS translation process succeeds. Therefore, by suspending the command process in response to the failure of the ATS translation process, it is possible to minimize a memory region in the internal buffer 62 that is occupied by read data that cannot be transmitted to the host 2. As a result, it is capable of mitigating a degradation in the performance of the I/O process of the SSD 3. In addition, by suspending the command process, a peak value of the data traffic between the controller 4 and the NAND memory 5 can be lowered. Therefore, a peak value of the power consumption of each of the NAND memory 5 and the controller 4 can also be lowered.

Here, a case in which the BE temporarily stops the command process according to the result indicated by the ATS completion response received at step S607 is described. However, instead of the ATS completion response, the occurrence of cache miss at step S605 may also be used as a trigger to temporarily stop the command process.

In a case where a cache miss has occurred in the ATC 441 in the data transfer process, it takes a longer time to obtain the address translation information than in a case where a cache hit occurs in the ATC 441. Therefore, by suspending the command process in response to the occurrence of the cache miss, a memory region in the internal buffer 62 that is occupied by read data that cannot be transmitted to the host 2 can be minimized.

Also, here, a case in which the BE resumes the command process in response to receiving the ATS completion response at step S615 is described. However, instead of the ATS completion response, the reception of the page request group response at step S613 may also be used as a trigger to resume the command process.

Also, here, a case in which the failure of the ATS translation process to translate the GPA corresponding to the memory location where the PRP list is stored is used as a trigger to suspend the command process is described. However, even after the PRP list has been obtained, the address translation process is performed in order to translate each of the GPAs included in the PRP list to an HPA. Even in a case where the ATS translation process fails in this address translation process, the command process may also be suspended.

In this manner, the command process may be suspended when the obtainment of the address translation information fails in either the ATS translation process of translating a GPA corresponding to a memory location where a PRP list is stored to an HPA or the ATS translation process of translating each of the GPAs included in the PRP list to an HPA.

Furthermore, in some cases, the PRP entry field included in the read command does not indicate a PRP list, however, indicates a GPA corresponding to a memory location to which the read data is to be transferred. In this case, the controller 4 may execute the address translation process that translates the GPA corresponding to the memory location to which the read data is to be transferred to an HPA, in parallel with the command process corresponding to the read command. In this case, when the ATS translation process fails in this address translation process, the controller 4 suspends the command process. Then, in response to receiving a page request group response from the host 2 or an ATS completion response indicating success from the host 2, the controller 4 resumes the command process.

Figure 13:
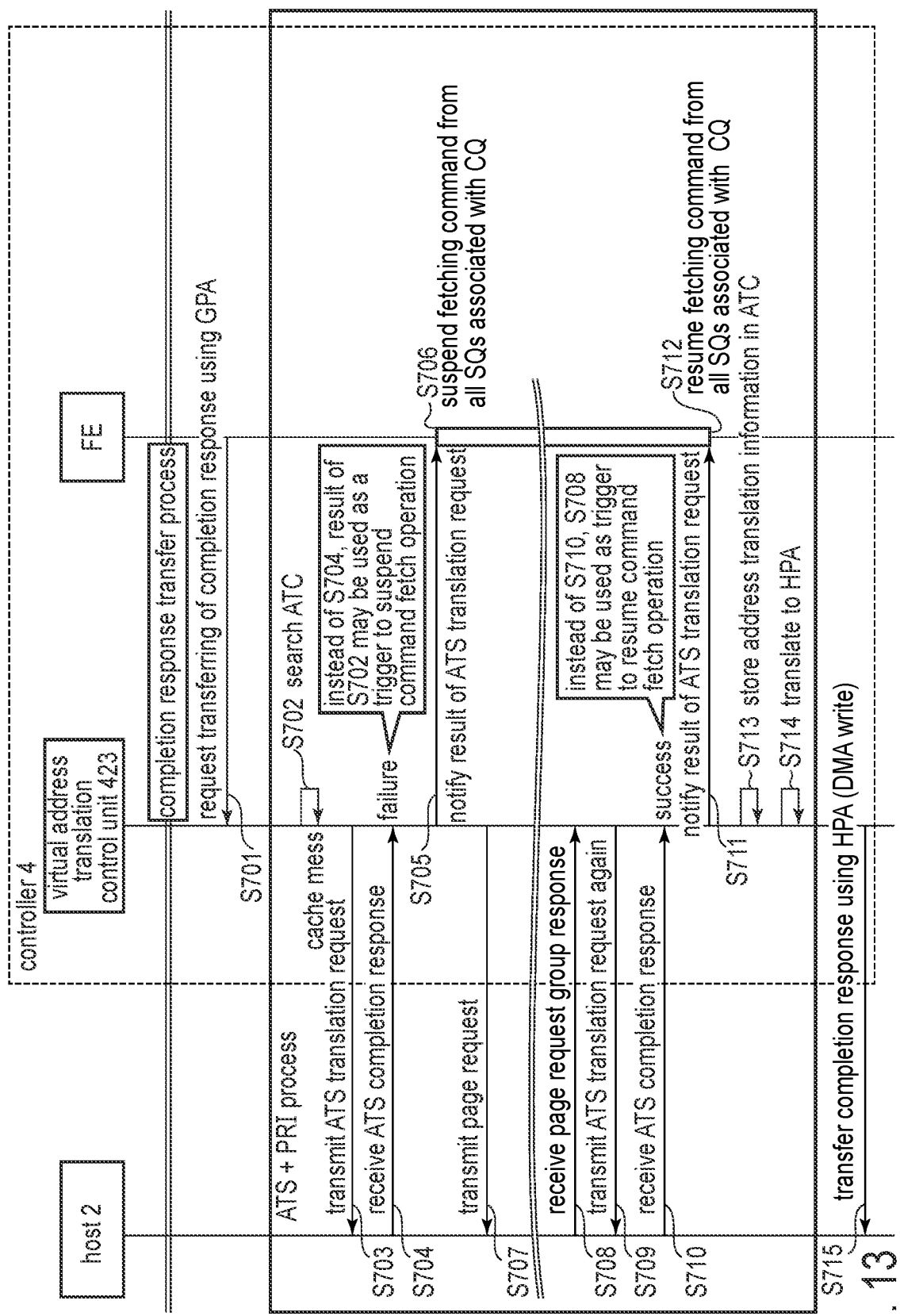
FIG. 13 is a sequence diagram illustrating a first example of a procedure of controlling a command fetch operation, the procedure being executed in the memory system according to the embodiment.

Next, an operation of controlling a command fetch operation on the basis of the status of the address translation process in the completion response transfer process will be described. FIG. 13 is a sequence diagram illustrating a first example of a procedure of controlling a command fetch operation, the procedure being executed in the memory system according to the embodiment. In FIG. 13, a case in which the command fetch operation is suspended in response to the failure of the ATS translation process in the completion response transfer process is assumed. This completion response transfer process may be a process of transmitting a completion response indicating completion of a read command or a process of transmitting a completion response indicating completion of a write command.

First, the FE issues a transfer request for transferring a completion response of a completed I/O command to the memory 22, using a GPA corresponding to a next free completion queue (CQ) slot in a CQ where the completion response of the completed I/O command is to be stored (step S701). The FE passes the issued transfer request to the virtual address translation control unit 423.

The virtual address translation control unit 423 searches the ATC 441 for address translation information corresponding to the GPA included in the transfer request (step S702).

When a cache miss has occurs in the ATC 441, the virtual address translation control unit 423 transmits, to the host 2, an ATS translation request specifying the GPA (step S703).

When receiving, from the host 2, an ATS completion response including a status indicating failure (step S704), the virtual address translation control unit 423 notifies the FE that the ATS translation process has failed, as a result of the ATS translation request (step S705).

When notified that the ATS translation process has failed, the FE suspends fetching an I/O command from each of all submission queues (SQ) associated with the completion queue (CQ) in which the completion response of the completed I/O command is to be stored (step S706). This is because a completion response corresponding to each of the I/O commands stored in these submission queues is to be transferred to the completion queue (CQ) to which the completion response included in the transfer request issued at step S701 is to be transferred. Therefore, until the address translation information that includes the HPA of a memory page where this completion queue (CQ) exists is prepared in the address translation protection table 215, the HPA of none of the slots of this completion queue (CQ) can be obtained. Thus, if an I/O command is fetched from each of these submission queues (SQs), a large number of completion responses that cannot be transmitted to the host 2 may occupy resources in the controller 4. By executing the control illustrated in FIG. 13, the resources in the controller 4 occupied by the completion responses that cannot be transmitted to the host 2 can be minimized.

Note that the FE may continue executing a process of fetching I/O commands from submission queues (SQ) associated with a completion queue (CQ) other than the completion queues (CQs) to which the completion responses of the completed I/O command is to be transferred.

After notifying the BE of the result of the ATS translation request at step S705, the virtual address translation control unit 423 transmits, to the host 2, a page request for requesting preparation of the address translation information (step S707). The host 2, which has received the page request, starts the process of preparing the address translation information. When the process of preparing the address translation information is completed, the host 2 transmits, to the virtual address translation control unit 423, a page request group response, which is a response indicating that the preparation of the address translation information is completed.

When receiving the page request group response from the host 2 (step S708), the virtual address translation control unit 423 transmits the ATS translation request to the host 2 again (step S709). This ATS translation request specifies the same GPA as the GPA specified in the ATS translation request transmitted at step S703. The host 2, which has received the ATS translation request, searches the address translation protection table 215 to obtain the address translation information corresponding to the specified GPA. The host 2 transmits, to the virtual address translation control unit 423 of the controller 4, an ATS completion response including the acquired address translation information and a status indicating success.

When receiving the ATS completion response including the address translation information and the status indicating success is received from the host 2 (step S710), the virtual address translation control unit 423 notifies the FE that the ATS translation process has succeeded, as a result of the ATS translation request (step S711).

The FE, which has received the notification, resumes fetching an I/O command from each of all submission queues (SQ) associated with the CQs in which the completion response to the completed I/O command is to be stored (step S712).

The virtual address translation control unit 423 stores the address translation information included in the ATS completion response received at step S710 in the ATC 441 (step S713).

The virtual address translation control unit 423 translates the GPA to an HPA using this address translation information (step S714).

The DMAC 43 transfers the completion response to the completion queue (CQ) in the memory 22 using the HPA translated by the virtual address translation control unit 423 (step S715).

Here, a case in which the FE suspends the command fetch operation according to the result indicated by the ATS completion response received at step S704 is described. However, instead of the ATS completion response, the occurrence of cache miss at step S702 may also be used as a trigger to suspend the command fetch operation.

Also, here, a case in which the FE resumes the command fetch operation in response to receiving the ATS completion response at step S710 is described. However, instead of the ATS completion response, the reception of the page request group response at step S708 may also be used as a trigger to resume the command fetch operation.

Next, a procedure of controlling the command fetch operation on the basis of the status of the address translation process in the interrupt transmission process is described.

Figure 14:
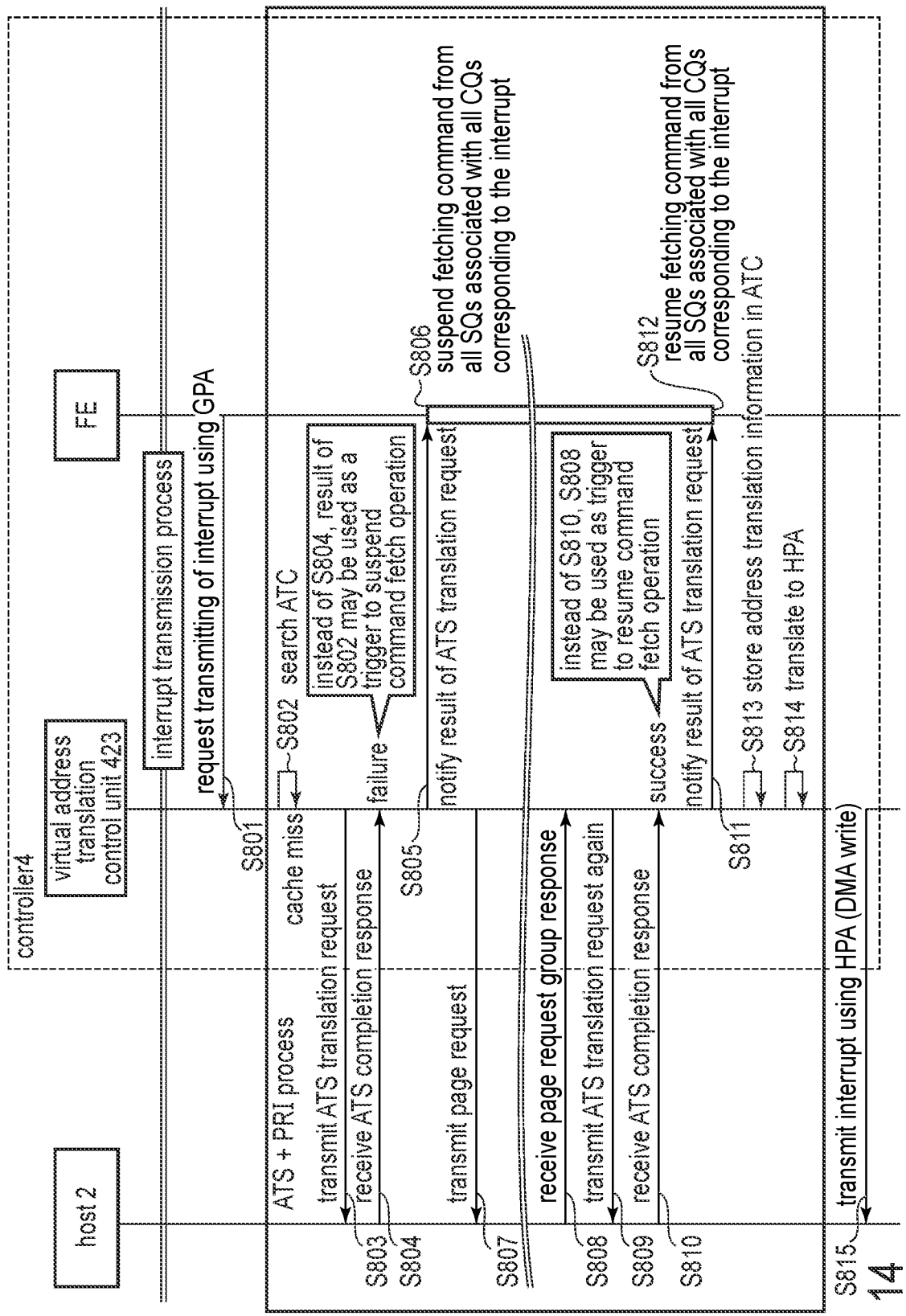
FIG. 14 is a sequence diagram illustrating a second example of a procedure of controlling the command fetch operation, the procedure being executed in the memory system according to the embodiment.

FIG. 14 is a sequence diagram illustrating a second example of a procedure of controlling the command fetch operation, the procedure being executed in the memory system according to the embodiment. In FIG. 14, a case in which the command fetch operation is suspended in response to the failure of the ATS translation process in the interrupt transmission process is assumed. This interrupt transmission process may be a process of transmitting either an interrupt message for notifying the host 2 that a command completion response for a read command has been stored in a completion queue (CQ), or an interrupt message for notifying the host 2 that a completion response for a write command has been stored in the completion queue (CQ).

First, the FE issues a transmission request of an interrupt message corresponding to a completion queue (CQ) where a completion response of a completed I/O command is stored, using a GPA corresponding to a memory location in the memory 22 to which the interrupt message is to be transmitted (step S801). The FE passes the issued transmission request to the virtual address translation control unit 423.

The virtual address translation control unit 423 searches the ATC 441 for address translation information corresponding to the GPA included in the transmission request (step S802).

When a cache miss occurs in the ATC 441, the virtual address translation control unit 423 transmits, to the host 2, an ATS translation request specifying the GPA (step S803).

When receiving an ATS completion response including a status indicating failure from the host 2 (step S804), the virtual address translation control unit 423 notifies the FE that the ATS translation process has failed, as a result of the ATS translation request (step S805).

When notified that the ATS translation process has failed, the FE suspends fetching an I/O command from each of all submission queues (SQ) associated with all completion queues (CQ) corresponding to this interrupt message (step S806). This is because an interrupt message corresponding to each of the I/O commands stored in these submission queues is to be transmitted to the memory location in the memory 22 to which the interrupt message included in the transmission request issued at step S801 is to be transmitted. Therefore, if an I/O command is fetched from each of these submission queues (SQ), a large number of interrupt messages that cannot be transmitted to the host 2 may occupy resources in the controller 4. By executing the control illustrated in FIG. 14, the resources in the controller 4 that are occupied by the interrupt messages that cannot be transmitted to the host 2 can be minimized.

Note that the FE may continue executing a process of fetching I/O commands from submission queues (SQ) associated with a completion queues (CQ) other than the completion queues (CQs) corresponding to this interrupt messages to be transmitted.

After notifying the FE of the result of the ATS translation request at step S805, the virtual address translation control unit 423 transmits, to the host 2, a page request for requesting the preparation of address translation information (step S807). The host 2, which has received the page request, starts the process of preparing the address translation information. When the process of preparing the address translation information is completed, the host 2 transmits, to the virtual address translation control unit 423, a page request group response, which is a response indicating that the preparation of the address translation information is completed.

When receiving the page request group response from the host 2 (step S808), the virtual address translation control unit 423 transmits the ATS translation request to the host 2 again (step S809). The ATS translation request specifies the same GPA as the GPA specified in the ATS translation request transmitted at step S803. The host 2, which has received the ATS translation request, searches the address translation protection table 215 and obtains the address translation information corresponding to the specified GPA. The host 2 transmits, to the virtual address translation control unit 423 of the controller 4, an ATS completion response including the obtained address translation information and a status indicating success.

When receiving the ATS completion response including the address translation information and the status indicating success from the host 2 (step S810), the virtual address translation control unit 423 notifies the FE that the ATS translation process has succeeded, as a result of the ATS translation request (step S811).

The FE, which has received the notification, resumes fetching an I/O command from each of all submission queues (SQ) associated with all completion queues (CQ) corresponding to this interrupt message (step S812).

The virtual address translation control unit 423 stores the address translation information included in the ATS completion response received at step S810 in the ATC 441 (step S813).

The virtual address translation control unit 423 translates the GPA to an HPA using this address translation information (step S814).

The DMAC 43 transfers the interrupt message to the memory 22 using the HPA translated by the virtual address translation control unit 423 (step S815).

Here, a case in which the FE suspends the command fetch operation according to the result of the ATS completion response received at step S804 is described. However, instead of the ATS completion response, the occurrence of the cache miss at step S802 may also be used as a trigger to suspend the command fetch operation.

Also, here, a case in which the FE resumes the command fetch operation in response to receiving the ATS completion response at step S810 is described. However, instead of the ATS completion response, the reception of the page request group response at step S808 may also be used as a trigger to resume the command fetch operation.

Figure 15:
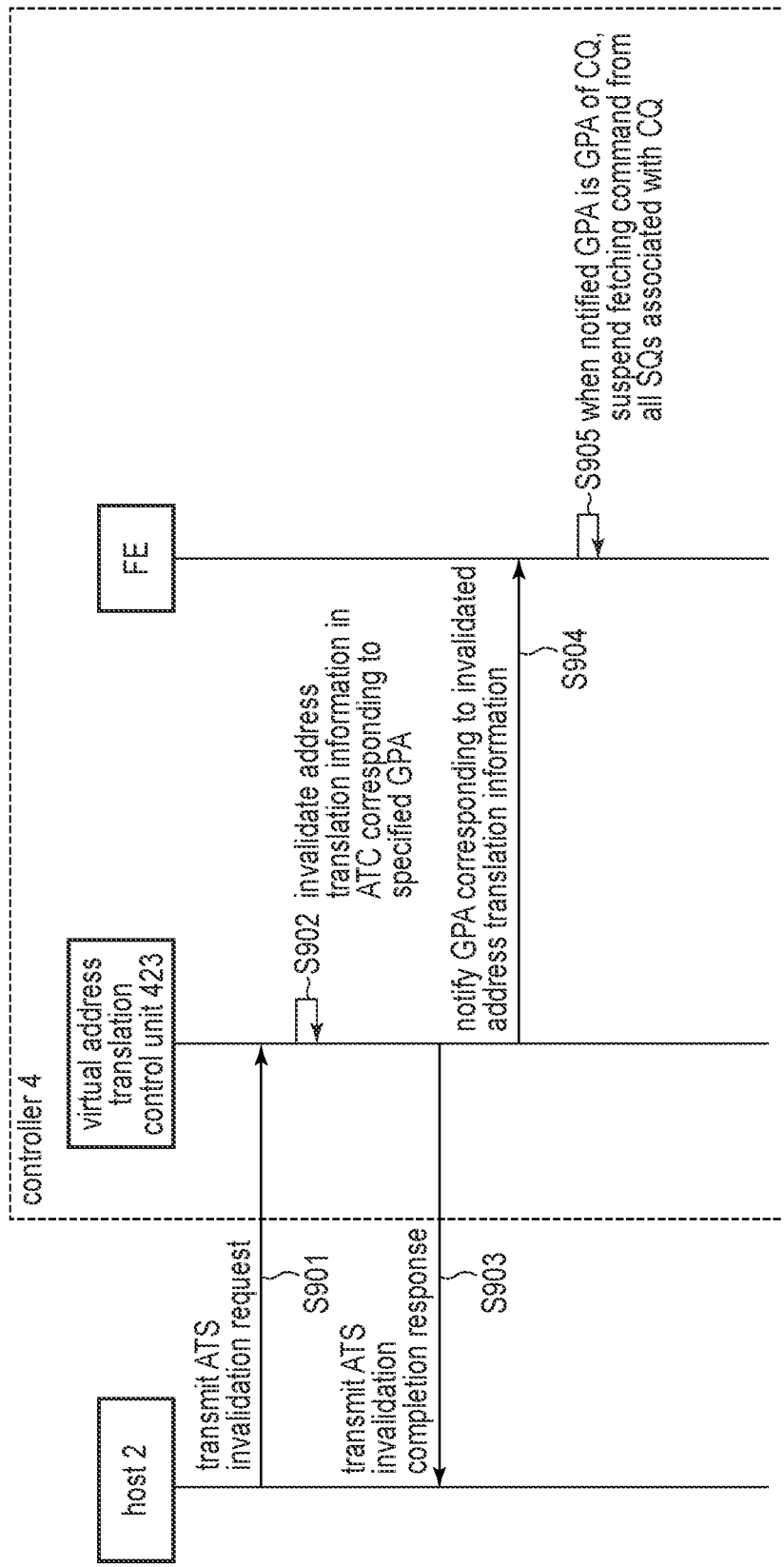
FIG. 15 is a sequence diagram illustrating a procedure of an invalidating process executed in the memory system according to the embodiment.

Next, a procedure of controlling the command fetch operation in response to receiving an invalidating command is described. FIG. 15 is a sequence diagram illustrating a procedure of an invalidating process executed in the memory system according to the embodiment.

First, in a case where the address translation information in the address translation protection table 215 has been changed, the host 2 transmits, to the controller 4, an ATS invalidation request for invalidating old address translation information. This ATS invalidation request specifies a GPA corresponding to address translation information to be invalidated.

When receiving the ATS invalidation request from the host 2 (step S901), the virtual address translation control unit 423 identifies an entry in the ATC 441 corresponding to the GPA specified by the received invalidation request and invalidates the address translation information stored in this entry (step S902).

The virtual address translation control unit 423 transmits, to the host 2, a completion response for the received ATS invalidation request (step S903).

The virtual address translation control unit 423 notifies the FE of the GPA corresponding to the address translation information invalidated at step S902 (step S904).

The FE determines whether or not the notified GPA is a GPA corresponding to a completion queue (CQ). In a case where the notified GPA is a GPA corresponding to any one of the completion queues (CQ), the FE suspends fetching I/O commands from all submission queues (SQ) associated with this completion queue (CQ) until the FE obtains, from the host 2, new address translation information for translating the GPA corresponding to this completion queue (CQ) to an HPA (step S905).

Also, in this case, resources in the controller 4 can be prevented from being occupied by a large number of completion responses that cannot be transmitted to the host 2.

As explained above, according to the present embodiment, in response to receiving a read command from the host 2, the read command specifying a virtual address in the virtual address space of the host 2, the controller 4 starts a command process of reading, from the NAND memory 5, read target data specified by the read command. In addition, the controller 4 executes an address translation process of translating a GPA, which is the virtual address specified by the read command, to an HPA, which is a physical address for accessing the memory 22 of the host 2. When the address translation process fails, the controller 4 suspends the command process of reading the read target data from the NAND memory 5 until the address translation information necessary for the address translation process can be obtained. Then, when the address translation information becomes obtainable, the controller 4 resumes the command process. By suspending the command process in this manner, it is possible to prevent the internal buffer 62 from being occupied for a long period of time by read data that cannot be transmitted to the host 2. Also, by suspending the command process, it is possible to prevent read data that cannot be transmitted to the host 2 from being transferred from the NAND memory 5 to the controller 4. This allows a peak value of the data traffic between the NAND memory 5 and the controller 4 to be lowered. Therefore, a peak value of power consumption of each of the NAND memory 5 and the controller 4 can also be lowered.

Also, in transmitting, to the host 2, information (completion response or interrupt message) for notifying the host 2 of completion of an I/O command, the controller 4 executes the address translation process. In this address translation process, a process of translating a GPA, which is a virtual address corresponding to a memory location in the memory 22 of the host 2 to which the completion response or the interrupt message is to be transferred, to an HPA, which is a physical address for accessing the memory 22, is executed.

When this address translation process fails, the controller 4 suspends the process of fetching an I/O command from each of submission queues associated with a completion queue in which the completion response for this completed I/O command is to be stored until the address translation information necessary for the address translation process becomes obtainable, then, after the address translation information becomes obtainable, resumes the process of fetching the I/O command from each of the submission queues associated with this completion queue. As a result, resources in the controller 4 can be prevented from being occupied by the completion responses or the interrupt messages that cannot be transmitted to the host 2.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system connectable to a host, comprising:
a nonvolatile memory; and
a controller electrically connected to the nonvolatile memory and configured to control the nonvolatile memory, wherein
the controller is configured to:
in response to obtaining a first I/O command from one of a plurality of submission queues stored in a memory of the host,
execute a command process of writing or reading data to or from the nonvolatile memory,
execute an address translation process of translating a first virtual address in a virtual address space of the host to a first physical address for accessing the memory of the host, the first virtual address being a virtual address corresponding to a memory location in the memory of the host to which first information is to be transferred, the first information being information for notifying the host of completion of the first I/O command,
in the address translation process, transmit an address translation request to the host, the address translation request being a request for obtaining first address translation information for translating the first virtual address to the first physical address, and
in response to receiving, from the host, a response indicating that obtainment of the first address translation information fails, suspend a first process of fetching an I/O command from one or more first submission queues in the memory of the host among the plurality of submission queues until the first address translation information is obtained, each of the one or more first submission queues being a submission queue associated with a first completion queue in the memory of the host in which a completion response of the first I/O command is to be stored, and, after the first address translation information is obtained, resume the first process.

2. The memory system of claim 1, wherein
the controller is configured to:
in response to receiving, from the host, a response indicating that the obtainment of the first address translation information fails,
suspend the first process;
transmit, to the host, a message requesting preparation of the first address translation information;
in response to receiving, from the host, a response indicating completion of the preparation of the first address translation information, transmit the address translation request to the host again; and
in response to receiving, from the host, the response indicating the completion of the preparation of the first address translation information or a response to the re-transmitted address translation request, the response to the re-transmitted address translation request including the first address translation information, resume the first process.

3. The memory system of claim 1, wherein
the controller is configured to:
  when the address translation process succeeds, transfer the first information to the memory of the host using the first physical address; and
  when the address translation process fails, suspend the first process, and, after the address translation process succeeds, resume the first process.

4. The memory system of claim 1, further comprising a cache memory, wherein
the controller is configured to:
  in the address translation process, when detecting that the first address translation information is not stored in the cache memory,
    suspend the first process;
    transmit the address translation request to the host; and
    in response to receiving, from the host, a response to the address translation request, the response to the address translation request including the first address translation information, resume the first process.

5. The memory system of claim 4, wherein
the controller is configured to:
  in response to receiving, from the host, an invalidation request specifying the first virtual address,
    invalidate the first address translation information in the cache memory; and
    suspend the first process until new address translation information corresponding to the first virtual address is obtained from the host.

6. The memory system of claim 1, wherein
the first information includes the completion response of the first I/O command, and
the first virtual address is a virtual address corresponding to a memory location in the memory of the host where the first completion queue is stored.

7. The memory system of claim 1, wherein
the first information includes an interrupt message for notifying the host that the completion response of the first I/O command has been stored in the first completion queue, and
the first virtual address is a virtual address corresponding to a memory location in the memory of the host to which the interrupt message is to be transferred.

* * * * *